(12) United States Patent
Wu et al.

(10) Patent No.: US 8,731,067 B2
(45) Date of Patent: May 20, 2014

(54) MEMORY MANAGEMENT FOR VIDEO DECODING

(75) Inventors: Yongjun Wu, Bellevue, WA (US); Shyam Sadhwani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 13/223,079

(22) Filed: Aug. 31, 2011

(65) Prior Publication Data

US 2013/0051478 A1   Feb. 28, 2013

(51) Int. Cl.
*H04N 7/12* (2006.01)
*H04N 11/02* (2006.01)
*H04N 11/04* (2006.01)

(52) U.S. Cl.
USPC ........... 375/240.25; 375/E7.027; 375/E7.094; 375/E7.014

(58) Field of Classification Search
USPC ..................................... 375/240.25
See application file for complete search history.

(56) References Cited

U.S. PATENT DOCUMENTS

| | | | |
|---|---|---|---|
| 4,309,754 A | 1/1982 | Dinwiddie, Jr. | |
| 4,642,756 A | 2/1987 | Sherrod | |
| 5,465,335 A | 11/1995 | Anderson | |
| 5,909,559 A | 6/1999 | So | |
| 6,002,801 A | 12/1999 | Strongin et al. | |
| 6,006,303 A | 12/1999 | Barnaby et al. | |
| 6,105,048 A | 8/2000 | He | |
| 6,249,288 B1 | 6/2001 | Campbell | |
| 6,278,691 B1 | 8/2001 | Ohyama et al. | |
| 6,823,016 B1 | 11/2004 | Nguyen et al. | |
| 6,963,347 B1 | 11/2005 | Selvaggi et al. | |
| 7,043,088 B2 | 5/2006 | Chiu et al. | |

(Continued)

FOREIGN PATENT DOCUMENTS

| | | |
|---|---|---|
| EP | 0 909 094 | 4/1999 |
| EP | 1 195 992 | 4/2002 |
| WO | WO 2006/096612 | 9/2006 |
| WO | WO 2006/134110 | 12/2006 |

OTHER PUBLICATIONS

De Neve et al., "Real-Time BSD-driven Adaptation Along the Temporal Axis of H.264/AVC Bitstreams," *Advances in Multimedia Information Processing*, pp. 131-140 (2006).

(Continued)

*Primary Examiner* — Dave Czekaj
*Assistant Examiner* — Nam Pham
(74) *Attorney, Agent, or Firm* — Aaron Chatterjee; Andrew Sanders; Micky Minhas

(57) ABSTRACT

Techniques and tools described herein help manage memory efficiently during video decoding, especially when multiple video clips are concurrently decoded. For example, with clip-adaptive memory usage, a decoder determines first memory usage settings expected to be sufficient for decoding of a video clip. The decoder also determines second memory usage settings known to be sufficient for decoding of the clip. During decoding, memory usage is initially set according to the first settings. Memory usage is adaptively increased during decoding, subject to theoretical limits in the second settings. With adaptive early release of side information, the decoder can release side information memory for a picture earlier than the decoder releases image plane memory for the picture. The decoder can also adapt memory usage for decoded transform coefficients depending on whether the coefficients are for intra-coded blocks or inter-coded blocks, and also exploit the relative sparseness of non-zero coefficient values.

22 Claims, 12 Drawing Sheets

(56) References Cited

U.S. PATENT DOCUMENTS

| | | | |
|---|---|---|---|
| 7,072,404 | B2 | 7/2006 | Itokawa |
| 7,085,322 | B2 | 8/2006 | Ngai et al. |
| 7,099,389 | B1 | 8/2006 | Yu et al. |
| 7,116,714 | B2 | 10/2006 | Hannuksela |
| 7,130,526 | B2 | 10/2006 | Abelard et al. |
| 7,289,047 | B2 | 10/2007 | Nagori |
| 7,366,236 | B1 | 4/2008 | Winger |
| 7,370,325 | B1 | 5/2008 | Hull et al. |
| 7,573,407 | B2 | 8/2009 | Reznik |
| 7,653,128 | B2 | 1/2010 | Shibata et al. |
| 7,735,087 | B2 | 6/2010 | Hayashi |
| 7,817,723 | B2 | 10/2010 | Wiegand et al. |
| 7,889,788 | B2 | 2/2011 | Toma et al. |
| 2002/0036707 | A1 | 3/2002 | Gu |
| 2003/0185298 | A1 | 10/2003 | Alvarez et al. |
| 2004/0117427 | A1 | 6/2004 | Allen et al. |
| 2004/0146109 | A1 | 7/2004 | Kondo et al. |
| 2004/0190617 | A1 | 9/2004 | Shen et al. |
| 2004/0208245 | A1 | 10/2004 | MacInnis et al. |
| 2005/0053157 | A1 | 3/2005 | Lillevold |
| 2005/0175091 | A1 | 8/2005 | Puri et al. |
| 2005/0180511 | A1 | 8/2005 | Arafune et al. |
| 2005/0289505 | A1 | 12/2005 | Williams |
| 2006/0002479 | A1 | 1/2006 | Fernandes |
| 2006/0056517 | A1 | 3/2006 | MacInnis et al. |
| 2006/0114995 | A1 | 6/2006 | Robey et al. |
| 2006/0126726 | A1 | 6/2006 | Lin et al. |
| 2006/0126744 | A1 | 6/2006 | Peng et al. |
| 2006/0133479 | A1 | 6/2006 | Chen et al. |
| 2006/0133770 | A1 | 6/2006 | Shibata et al. |
| 2006/0193383 | A1 | 8/2006 | Alvarez et al. |
| 2006/0204119 | A1 | 9/2006 | Feng et al. |
| 2006/0215754 | A1 | 9/2006 | Buxton et al. |
| 2006/0227872 | A1 | 10/2006 | Mori et al. |
| 2006/0233525 | A1 | 10/2006 | Shibata et al. |
| 2006/0239343 | A1 | 10/2006 | Mohsenian |
| 2006/0248516 | A1 | 11/2006 | Gordon |
| 2007/0030911 | A1 | 2/2007 | Yoon |
| 2007/0183507 | A1 | 8/2007 | Maheshwari et al. |
| 2007/0223595 | A1 | 9/2007 | Hannuksela et al. |
| 2007/0233989 | A1* | 10/2007 | Garcia-Arellano et al. .. 711/170 |
| 2007/0291857 | A1 | 12/2007 | Hussain |
| 2007/0297501 | A1 | 12/2007 | Hussain et al. |
| 2008/0013620 | A1 | 1/2008 | Hannuksela et al. |
| 2008/0048894 | A1 | 2/2008 | Ridge et al. |
| 2008/0107184 | A1 | 5/2008 | Katsavounidis et al. |
| 2008/0137736 | A1 | 6/2008 | Richardson et al. |
| 2009/0002379 | A1 | 1/2009 | Baeza et al. |
| 2009/0003446 | A1 | 1/2009 | Wu et al. |
| 2009/0003447 | A1 | 1/2009 | Christoffersen et al. |
| 2009/0003451 | A1 | 1/2009 | Lin et al. |
| 2009/0147859 | A1 | 6/2009 | McGowan et al. |
| 2010/0008418 | A1 | 1/2010 | Wu et al. |
| 2010/0158135 | A1 | 6/2010 | Yin et al. |
| 2010/0189182 | A1 | 7/2010 | Hannuksela |
| 2010/0195721 | A1 | 8/2010 | Wu et al. |

OTHER PUBLICATIONS

MainConcept, "MainConcept™ Showcase 2.8," 4 pp. (downloaded from the World Wide Web on Apr. 6, 2011).

Schwarz et al., "Overview of the Scalable H.264/MPEG4-AVC Extension," *IEEE Intl Conf. on Image Processing*, pp. 161-164 (Oct. 2006).

Segall et al., "Spatial Scalability Within the H.264/AVC Scalable Video Coding Extension," *IEEE Trans. on Circuits and Systems for Video Technology*, vol. 17, No. 9, pp. 1121-1135 (Sep. 2007).

Sullivan, "DirectX Video Acceleration Specification for H.264/AVC Decoding," 66 pp. (Dec. 2007—updated Dec. 2010).

Sullivan et al., "DirectX Video Acceleration Specification for H.264/MPEG-4 AVC Multiview Video Coding (MVC), Including the Stereo High Profile," 17 pp. (Mar. 2011).

Wiegand et al., "Introduction to the Special Issue on Scalable Video Coding—Standardization and Beyond," *IEEE Trans. on Circuits and Systems for Video Technology*, vol. 17, No. 9, pp. 1099-1102 (Sep. 2007).

3rd Generation Partnership Project, "Multimedia telephony over IP Multimedia Subsystem (IMS); Optimization opportunities (Release 7)," 3GPP Technical Report TR 26.914 V7.0.0, 18 pp. (Mar. 2006).

Akramullah et al., "Parallelization of MPEG-2 Video Encoder for Parallel and Distributed Computing Systems," *IEEE*, pp. 834-837 (Aug. 1995).

ATI Technologies, Inc., "Introduction to H.264," 6 pp. (month unknown, 2005).

Azevedo et al., "A Highly Scalable Parallel Implementation of H.264," Transactions on High-Performance Embedded Architectures and Compilers, 25 pp. (Sep. 2009).

Chen et al., "Implementation of H.264 Encoder and Decoder on Personal Computers," *Journal of Visual Comm. and Image Representation*, 19 pp. (Apr. 2006).

Chen, "Synchronization and Control of Multi-threads for MPEG-4 Video Decoder," *IEEE 1999 Int'l Conf. on Consumer Electronics*, pp. 298-299 (Jun. 1999).

Dawson, "Coding for Multiple Cores on Xbox 360 and Microsoft Windows," 8 pp. (Aug. 2006) [Downloaded from the Internet on Jan. 22, 2007].

Duffy, "CLR Inside Out: Using Concurrency for Scalability," MSDN Magazine, 11 pp. (Sep. 2006) [Downloaded from the Internet on Jan. 22, 2007].

foldoc.org, "priority scheduling," 1 p. (No date) [Downloaded from the Internet on Jan. 26, 2007].

foldoc.org, "multitasking," 1 p. (Document dated Apr. 24, 1998) [Downloaded from the Internet on Jan. 26, 2007].

Gerber et al., "Optimizing Video Encoding using Threads and Parallelism: Part 1—Threading a video codec," 3 pp., downloaded from Embedded.com, (Dec. 2009).

Huang et al., "Joint Algorithm/Code-Level Optimization of H.264 Video Decoder for Mobile Multimedia Applications," ICASSP, pp. 2189-2192 (Mar. 2008).

Intel Corp., "Intel's Next Generation Integrated Graphics Architecture—Intel® Graphics Media Accelerator X3000 and 3000," 14 pp. (Jul. 2006).

ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).

ISO/IEC, "Text of ISO/IEC FCD 29199-2 (JPEG XR image coding—Specification)," ISO/IEC JTC 1/SC 29/WG 11 N4739, 173 pp. (Sep. 2008).

ISO/IEC, "Digital Compression and Coding of Continuous-tone Still Images," ISO DIS 10918-1, CCITT Recommendation T.81, 211 pp. (1992).

ITU, "Advanced video coding for generic audiovisual services," Recommendation ITU-T H.264, 676 pp. (Mar. 2010).

Jacobs et al., "Thread-Parallel MPEG-2, MPEG-4 and H.264 Video Encoders for SoC Multi-Processor Architectures," *IEEE Trans. on Consumer Electronics*, vol. 52, No. 1, pp. 269-275 (Feb. 2006).

Joint Collaborative Team on Video Coding, "Description of video coding technology proposal by Texas Instruments Inc.," JCTVC-A101, 45 pp. (Apr. 2010).

Kim et al., "Multi-thread VLIW processor architecture for HDTV decoding," *IEEE 2000 Custom Integrated Circuits Conf.*, pp. 559-562 (May 2000).

Loomis et al., "VC-1 Technical Overview," 7 pp. (Apr. 2006) [Downloaded from the Internet on Jan. 24, 2007].

Marpe et al., "A Fast Renormalization Technique for H.264/MPEG4-AVC Arithmetic Coding," 14 pp. (2006).

Murata et al., "Fast 2D IDCT Implementation with Multimedia Instructions for a Software MPEG2 Decoder," *Int'l Conf. on Acoustics, Speech, and Signal Processing*, vol. 5, pp. 3105-3108 (May 1998).

Narasimhan, "Contributions to Carriage of AVC in MPEG-2," ISO/IEC/JTC1/SC29/WG11, MPEG2003/m9448, 12 pp. (2003).

Oehring et al., "MPEG-2 Video Decompression on Simultaneous Multithreaded Multimedia," *Int. Conf. on Parallel Architectures and Compilation Techniques (PACT '99)*, Newport Beach, CA (Oct. 1999).

(56) References Cited

OTHER PUBLICATIONS

Ostermann et al., "Video Coding with H.264/AVC: Tools, Performance, and Complexity," *IEEE Circuits and Systems Magazine*, pp. 7-28 (Aug. 2004).

Prada-Rojas et al,. "Towards a Component-based Observation of MPSoC," *IEEE*, pp. 542-549 (Sep. 2009).

Richardson, H.264 and MPEG-4 Video Compression: Video Coding for Next-generation Multimedia, Chapter 6, "H.264/MPEG4 Part 10," pp. 159-223 (Aug. 2003).

Sambe et al., "High-speed Distributed Video Transcoding for Multiple Rates and Formats," *IEICE Trans on Information and Systems*, vol. E88-D, Issue 8, pp. 1923-1931 (Aug. 2005).

SMPTE, "Proposed SMPTE Standard for Television: VC-1 Compressed Video Bitstream Format and Decoding Process," SMPTE 421M, pp. i-xx, 5-7, 23-27 (Aug. 2005).

SMPTE, "VC-1 Compressed Video Bitstream Format and Decoding Process," SMPTE 421M-2006, 493 pp. (Feb. 2006).

Sullivan et al., "Microsoft DirectX VA: Video Acceleration API/DDI," 88 pp. (2001).

Van Der Tol et al., "Mapping of MPEG-4 decoding on a flexible architecture platform," *Proceedings of the SPIE, Media Processors*, vol. 4674, 13 pp. (Jan. 2002).

Van Der Tol et al., "Mapping of H.264 decoding on a multiprocessor architecture," *Proceedings of the SPIE*, vol. 5022, pp. 707-718 (May 2003).

Wang, "H.264 Baseline Video Implementation on the CT3400 Multicore DSP," Cradle Technologies, 15 pp. (2006).

Wang, "[Mp4-tech] [H.264] output timing, bumping process, missing HRD parameters," downloaded from World Wide Web, 3 pp. (document marked May 5, 2006).

Wikipedia, "Motion JPEG," 4 pp., downloaded from the World Wide Web on Dec. 29, 2010.

Yadav et al., "Software-only Multiple Variable Length Decoding for Real-Time Video on MDSP," *Int'l Conf. on Consumer Electronics*, pp. 141-142 (Jan. 2005).

Youssef, "JPEG and MPEG Standards," 14 pp., downloaded from the World Wide Web on Dec. 29, 2010.

U.S. Appl. No. 11/703,613.
U.S. Appl. No. 13/848,631.
U.S. Appl. No. 11/824,563.
U.S. Appl. No. 11/824,508.
U.S. Appl. No. 12/966,914.
U.S. Appl. No. 12/978,501.
U.S. Appl. No. 13/223,079.
U.S. Appl. No. 13/329,093.

\* cited by examiner software 180 implementing one or more innovations for managing memory usage during video decoding

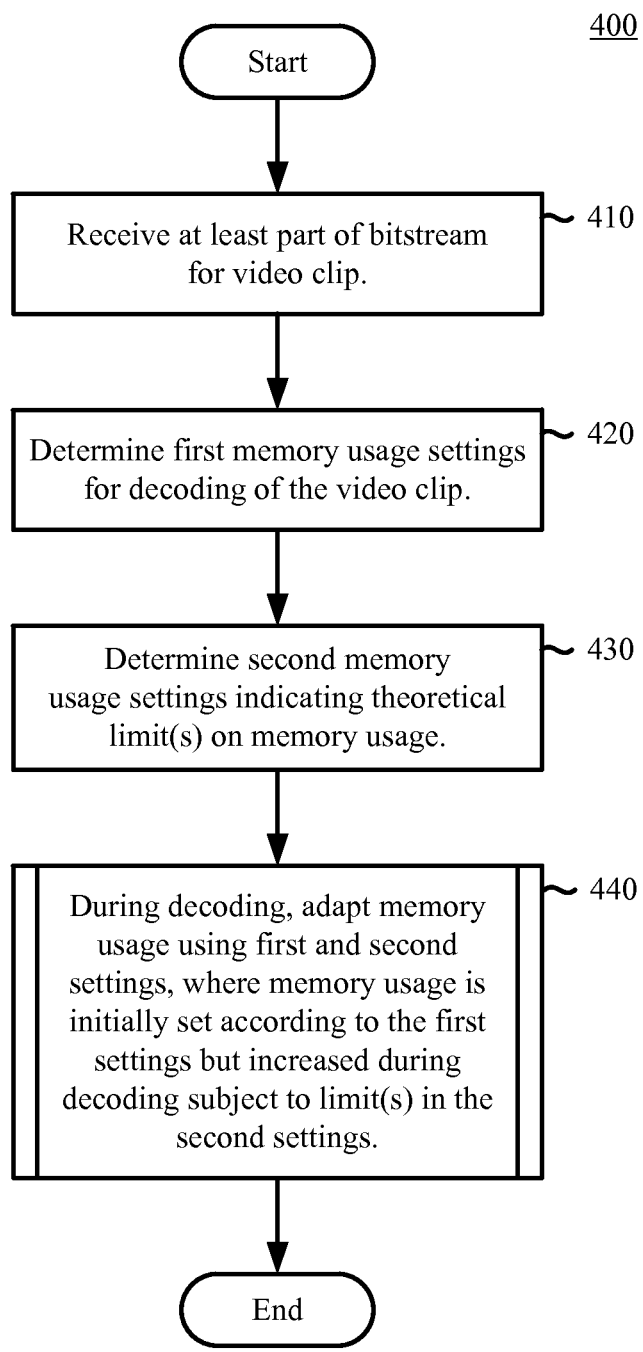

Figure 6

Allocate 200 KB buffer.

Get 175 KB data for picture.

Get 50 KB data for next picture.

Get 75 KB data for next picture.

Get 225 KB data for next picture.

Release 200 KB buffer.

Allocate 300 KB buffer.

Get 75 KB data for next picture.

Get 50 KB data for next picture.

Get 200 KB data for next picture.

Get 75 KB data for next picture.

Get 50 KB data for next picture.

Get 350 KB data for next picture.

Release 300 KB buffer.

Allocate 400 KB buffer.

Get 75 KB data for next picture.

Get 100 KB data for next picture.

Get 225 KB data for next picture.

Get 75 KB data for next picture.

Get 125 KB data for next picture.

Get 275 KB data for next picture.

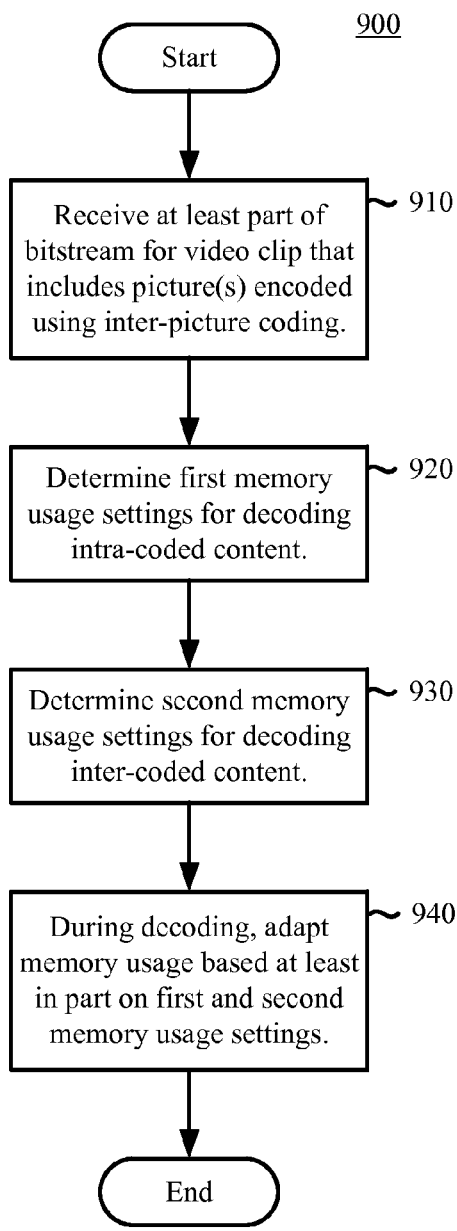

Figure 10

Allocate 50 KB fragment buffer for intra-coded blocks.

Allocate 500 KB fragment buffer for inter-coded blocks.

Get 10 KB intra-coded block coefficients and 75 KB inter-coded block coefficients.

Get 50 KB intra-coded block coefficients and 100 KB inter-coded block coefficients.

Allocate additional 50 KB fragment buffer for intra-coded blocks.

Get 10 KB intra-coded block coefficients and 50 KB inter-coded block coefficients.

Get 20 KB intra-coded block coefficients and 100 KB inter-coded block coefficients.

Get 20 KB intra-coded block coefficients and 75 KB inter-coded block coefficients.

Allocate additional 50 KB fragment buffer for intra-coded blocks.

Initiate decoding for frame 0 (display order) / 0 (coded order).
    Allocate side information buffers for frame 0 / 0.
    Allocate image plane buffer for frame 0 / 0.
Initiate decoding for frame 4 (display order) / 1 (coded order).
    Allocate side information buffers for frame 4 / 1.
    Allocate image plane buffer for frame 4 / 1.
Initiate decoding for frame 2 (display order) / 2 (coded order).
    Allocate side information buffers for frame 2 / 2.
    Allocate image plane buffer for frame 2 / 2.
    Release side information buffer for frame 4 / 1.
Initiate decoding for frame 1 (display order) / 3 (coded order).
    Allocate side information buffers for frame 1 / 3.
    Allocate image plane buffer for frame 1 / 3.
    Release side information buffers for frame 0 / 0.
    Release image plane buffer for frame 0 / 0.
    Release side information buffers for frame 1 / 3.
    Release image plane buffer for frame 1 / 3.
Initiate decoding for frame 3 (display order) / 4 (coded order).
    Allocate side information buffers for frame 3 / 4.
    Allocate image plane buffer for frame 3 / 4.
    Release side information buffers for frame 2 / 2.
    Release image plane buffer for frame 2 / 2.
Initiate decoding for frame 8 (display order) / 5 (coded order).
    Release side information buffers for frame 3 / 4.
    Release image plane buffer for frame 3 / 4.
    Release image plane buffer for frame 4 / 1.
    Allocate side information buffers for frame 8 / 5.
    Allocate image plane buffer for frame 8 / 5.
Initiate decoding for frame 6 (display order) / 6 (coded order).
    .
    .
    .

MEMORY MANAGEMENT FOR VIDEO DECODING

BACKGROUND

When video is streamed over the Internet and played back through a Web browser or media player, the video is delivered in digital form. Digital video is also used when video is delivered through many broadcast services, satellite services and cable television services. Real-time videoconferencing typically uses digital video, and digital video is used during video capture with most smartphones, Web cameras and other video capture devices.

Digital video can consume an extremely high amount of bits. Engineers use compression (also called source coding or source encoding) to reduce the bitrate of digital video. Compression decreases the cost of storing and transmitting video information by converting the information into a lower bitrate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. In particular, decoding according to the H.264 standard is widely used in game consoles and media players to play back encoded video. H.264 decoding is also widely used in set-top boxes, personal computers, smart phones and other mobile computing devices for playback of encoded video streamed over the Internet or other networks. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding. Often, however, the low-level details of the operations are not specified, or the decoder is able to vary certain implementation details such as memory utilization to improve performance, so long as the correct decoding results are still achieved.

Video decoding can be memory intensive. During decoding, some buffers store encoded video data. Other buffers store various types of side information used during decoding for pictures of a video sequence, and still other buffers store reconstructed versions of pictures, each of which can include millions of sample values. Further, in some application scenarios, a device concurrently plays back multiple video clips. This might occur, for example, when a Web page includes multiple video tags for video clips that are played back at the same time. Or, it might occur when a video editing tool opens multiple video clips for editing or playback. For such application scenarios, video decoding can be especially memory intensive.

SUMMARY

In summary, techniques and tools described herein help manage memory efficiently during video decoding. The techniques and tools can reduce overall memory usage during decoding, especially for application scenarios in which multiple video clips are concurrently played back or edited, with the same or better performance in terms of decoding speed and throughput.

According to a first set of techniques and tools described herein, in a computing system that implements a video decoder, the decoder receives at least part of a bitstream for a video clip. The decoder determines first memory usage settings for decoding of the video clip. For example, the first memory usage settings are expected to be sufficient for the decoding of the video clip. The decoder also determines second memory usage settings that indicate one or more theoretical limits on memory usage according to a standard or format specification for decoding of the video clip.

During the decoding of the video clip, the video decoder adapts memory usage based at least in part on the first and second memory usage settings. Initially, memory usage is set according to the first memory usage settings. Memory usage is adaptively increased during decoding, however, subject to the theoretical limit(s) in the second memory usage settings. For example, the decoder initializes a coded data buffer size according to the first memory usage settings, but dynamically grows the coded data buffer size during decoding when the encoded data for a given picture of the video clip is greater than the coded data buffer size, up to a theoretical limit size set according to the second memory usage settings.

Or, as another example of adaptation of memory usage, when the computing system uses multiple threads for decoding, the decoder allocates one or more default buffers each having a default coded data buffer size (according to the first memory usage settings) and allocates a reserve buffer having a reserve coded data buffer size (according to a theoretical size limit in the second memory usage settings). During decoding, as needed, the reserve buffer can store encoded data for at least one given picture of the video clip if the encoded data for the given picture is greater than the default coded data buffer size. Otherwise, the decoder uses a default-size buffer to store the encoded data for the given picture.

Or, as another example of adaptation of memory usage, the video decoder allocates one or more side information buffers according to size of memory for side information in the first memory usage settings, and the decoder allocates a reconstructed picture buffer according to size of memory for reconstructed image plane information in the first memory usage settings. If the spatial resolution increases during decoding of the video clip, the decoder increases the size of memory for side information and the size of memory for reconstructed image plane information, frees the previous memory for side information and reconstructed image plane information, and re-allocates memory for side information and reconstructed image plane information at the increased sizes. Otherwise, the decoder can reuse the same memory for side information and same memory for reconstructed image plane information.

According to a second set of techniques and tools described herein, in a computing system that implements a video decoder, the decoder receives at least part of a bitstream for a video clip. During decoding of multiple pictures of the video clip, for each of the pictures, the decoder allocates first memory for storing side information associated with the picture (e.g., motion vector information, reference index information, slice identifier information, mode information and/or partition information). The decoder also allocates second memory for storing reconstructed image plane information associated with the picture. Upon determination that a given picture is no longer to be used for reference in motion compensation during subsequent decoding, the decoder releases the first memory for that picture. Upon deletion of the given picture from a decoded picture buffer, the decoder releases the second memory for that picture. To accelerate the release of memory, the decoder can set priority of tasks whose completion enables release of reconstructed image plane memory higher than priority of tasks in which reconstructed image plane memory is allocated.

According to a third set of techniques and tools described herein, in a computing system that implements a video decoder, the decoder receives at least part of a bitstream for a video clip, which includes at least one picture encoded using inter-picture coding. The decoder determines first memory usage settings for decoding intra-coded content of the inter-coded pictures. The decoder also determines second memory usage settings for decoding inter-coded content of the inter-coded pictures. During decoding, the decoder adapts memory usage based at least in part on the first and second memory usage settings. For example, the decoder allocates a first buffer according to the first memory usage settings and, in the first buffer, stores entropy decoded transform coefficients for intra-coded blocks of a given picture. The decoder also allocates a second buffer according to the second memory usage settings and, in the second buffer, stores entropy decoded transform coefficients for inter-coded blocks of the given picture. Due to the relative rarity of intra-coded blocks in inter-coded pictures for most video clips, the initial size of the first buffer is significantly smaller than the initial size of the second buffer. During decoding, the size for the first buffer and/or size for the second buffer can dynamically grow, but the size of the first buffer typically remains much smaller than the size of the second buffer.

The foregoing and other objects, features, and advantages of the invention will become more apparent from the following detailed description, which proceeds with reference to the accompanying figures.

BRIEF DESCRIPTION OF THE DRAWINGS

FIG. 4 is a flowchart showing an example technique for adapting memory usage depending on a video clip, subject to limits on memory consumption.

FIG. 6 is a listing that illustrates dynamic growth in size of a coded data buffer during decoding.

FIG. 9 is a flowchart showing an example technique for adapting memory usage for intra-coded content and inter-coded content of inter-coded pictures of a video clip.

FIG. 10 is a listing that illustrates adaptation of buffer sizes for intra-coded content and inter-coded content of inter-coded pictures of a video clip.

FIG. 14 is a listing that illustrates adaptive early release of memory for side information during video decoding.

DETAILED DESCRIPTION

Figure 1:
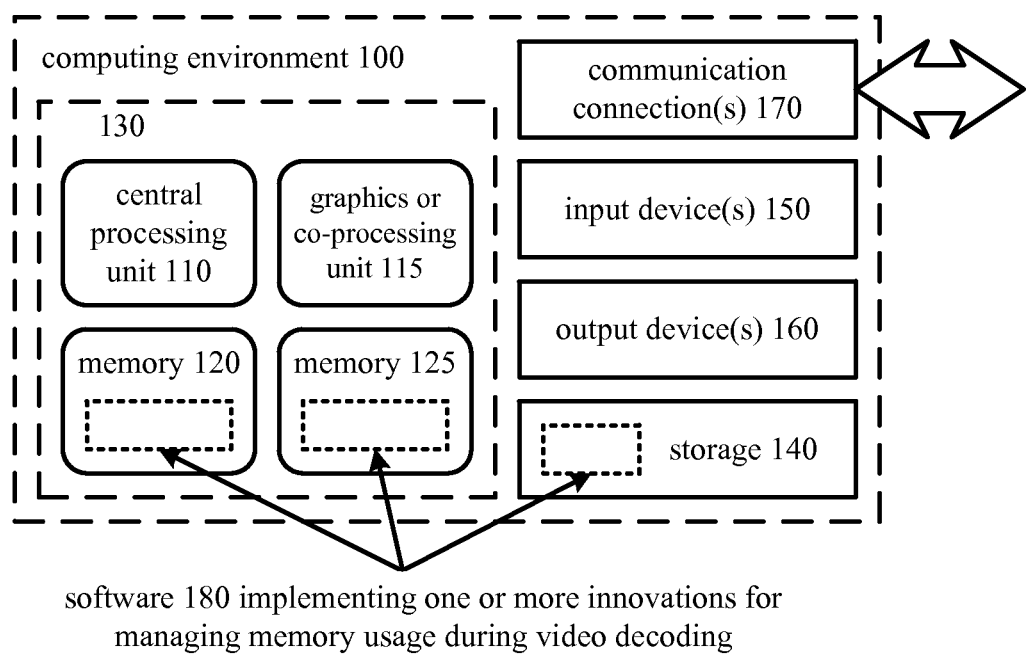
FIG. 1 is a diagram of an example computing system in which some described embodiments can be implemented.

In video decoding scenarios, memory is used to buffer coded data before decoding, buffer side information used during decoding, and buffer reconstructed pictures after the pictures have been decoded. Video decoding is inherently memory-intensive. In common cases, however, memory usage can be reduced. For example, in many decoder implementations, memory settings are defined according to default capabilities of a computing system or video decoder, regardless of the actual content of video to be decoded. Or, memory settings are defined according to "worst-case" memory usage values signaled for a video clip, e.g., with profile and level values in a bitstream, regardless of the actual content of the video to be decoded under the profile/level constraints. In such cases, overall memory usage can be reduced.

The detailed description presents techniques and tools for managing memory efficiently during video decoding. The techniques and tools can reduce overall memory usage during decoding, especially for application scenarios in which multiple video clips are concurrently played back or edited. The memory management techniques and tools described herein include features of clip-adaptive memory usage, adaptive buffering of coded data for intra-coded blocks and inter-coded blocks, adaptive buffer usage for different GOP structures and picture types, and adaptive early release and delayed allocation of memory. The different features can be used in combination or separately.

With clip-adaptive memory usage, a video decoder can adapt memory usage according to the content of a video clip being decoded. The decoder can adapt by selectively increasing memory usage as needed during decoding of the clip, based upon bit rate of coded data for part of the clip, spatial resolution for part of the clip, group of picture (GOP) structure, picture type information and/or other characteristics of the clip.

For example, the decoder can adapt buffer size for one or more buffers that store coded data for a picture prior to decoding, starting with a buffer size that is expected to be sufficient, and gradually increasing the buffer size as needed during decoding. In contrast, in other systems, the buffer size is set according to the maximum bit rate per picture (which corresponds to maximum coded data size for a compressed picture, or to the maximum size of network access layer unit (NALU) in the H.264 standard). In many cases, by starting the coded data buffer size at a lower value and increasing it only as needed, the buffer size stabilizes at a level much lower than the maximum that is theoretically possible for a clip. In many cases, the buffer size stabilizes at a size 10 to 20 times less than the theoretical upper limit for a clip.

As another example, the decoder can adapt buffer size for side information and reconstructed image plane information based on spatial resolution for a video clip, starting at buffer sizes appropriate for the resolution signaled for a clip, and increasing the buffer sizes as needed if the spatial resolution changes. In contrast, in other systems, the buffer sizes for side information memory and reconstructed image plane memory are set to the maximum supported for a system, decoder, or clip (based on profile and level values). In many cases, starting with buffer sizes more closely matched to a clip saves memory. The decoder can further adapt how many buffers are allocated for side information (e.g., motion vectors, reference indices) based on GOP structure and picture type information, using different numbers of buffers per picture with only intra coded content, picture with intra-coded content and/or predictive content, or picture that includes at least some bi-predictive content. In this way, the decoder can adapt the "live" working set of memory for side information for a GOP.

With adaptive buffering of entropy decoded transform coefficients for intra-coded blocks and inter-coded blocks, a video decoder can adapt buffer sizes for buffers that store entropy decoded transform coefficients for intra-coded blocks and buffers that store entropy decoded transform coefficients for inter-coded blocks. In particular, the decoder can set a smaller buffer size for coded coefficients of intra-coded blocks of pictures that include a mix of intra-coded content and inter-coded content. This exploits the relative rarity of coded coefficients for intra-coded blocks of such pictures in most instances. In contrast, in other systems, buffer sizes are set for entropy decoded transform coefficients of intra-coded blocks according to "worst-case" assumptions about prevalence of entropy decoded transform coefficients for intra-coded blocks. In many cases, by starting the buffer size for intra-coded blocks at a lower value and increasing it only as needed, the buffer size stabilizes at a level much lower than the maximum that is theoretically possible for a clip.

With adaptive early release of side information memory and delayed allocation of memory, a video decoder can reduce the size of the working set of memory during decoding. For example, the decoder releases side information memory for a picture when the side information is no longer used during decoding, even if the picture has not yet been output and reconstructed image plane memory for the picture has not been released. This early release of side information memory frees memory and reduces the working set of memory. The decoder can also delay allocation of memory during decoding to shorten the average lifetime of memory. For example, during multi-threaded decoding, the decoder can use task scheduling in which tasks whose completion frees memory are given higher priority than tasks in which memory is allocated.

In addition to reducing memory usage, the techniques and tools can improve overall decoding performance by increasing memory locality during video decoding. With better memory locality, access operations are faster. Some of the memory management techniques and tools described herein can be implemented with single-threaded software decoding, multi-threaded software implementations of decoding, hardware-accelerated video decoding or another implementation of video decoding. Other memory management techniques and tools are specific to a particular type of implementation (e.g., multi-threaded software). In general, the memory management techniques and tools described herein need not affect conformance to a particular standard or format—memory can be managed more efficiently while the decoder still produces conformant results.

Some of the innovations described herein are illustrated with reference to syntax elements and operations specific to the H.264 standard. Such innovations can also be implemented for decoding according to other standards or formats. For example, innovations described herein can be use to improve the efficiency of memory usage when decoding according to VP6, VP8/WebM, VC-1 or another format.

More generally, various alternatives to the examples described herein are possible. Certain techniques described with reference to flowchart diagrams can be altered by changing the ordering of stages shown in the flowcharts, by splitting, repeating or omitting certain stages, etc. The various aspects of memory management in video decoding can be used in combination or separately. Different embodiments use one or more of the described techniques and tools. Some of the techniques and tools described herein address one or more of the problems noted in the background. Typically, a given technique/tool does not solve all such problems.

I. Example Computing Systems.

FIG. 1 illustrates a generalized example of a suitable computing system (100) in which several of the described techniques and tools may be implemented. The computing system (100) is not intended to suggest any limitation as to scope of use or functionality, as the techniques and tools may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for adaptive memory usage in video decoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information in a non-transitory way and which can be accessed within the computing system (100). The storage (140) stores instructions for the software (180) implementing one or more innovations for adaptive memory usage in video decoding.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The techniques and tools can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The techniques and tools can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Decoder Systems.

Figure 2:
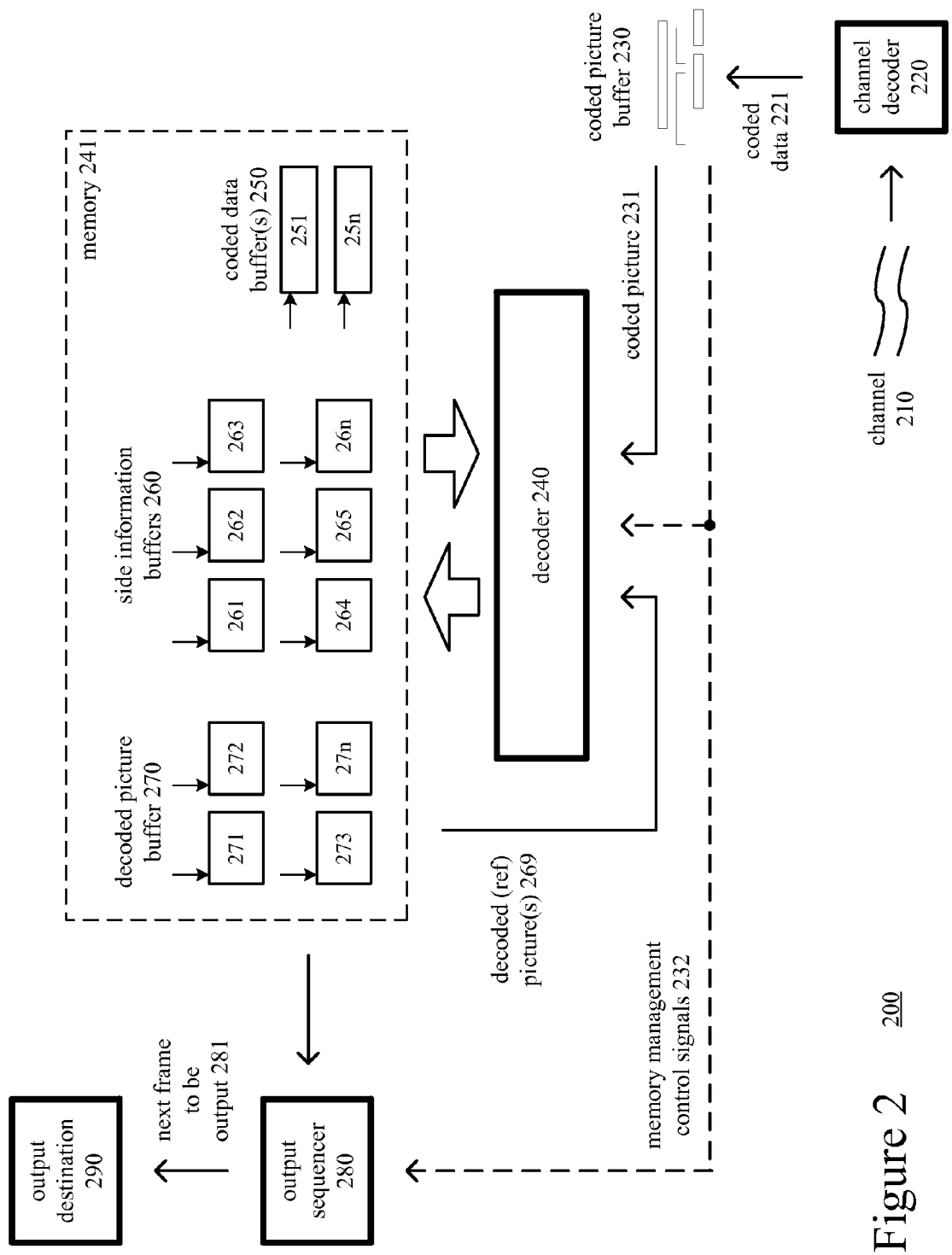
FIG. 2 is a diagram of an example decoder system in conjunction with which some described embodiments can be implemented.

FIG. 2 is a block diagram of an example decoder system (200) in conjunction with which some described embodiments may be implemented. The decoder system (200) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (200) can be implemented as an operating system module, as part of an application library or as a standalone application. Overall, the decoder system (200) receives coded data from a channel (210) and produces reconstructed frames as output for an output destination (290).

The decoder (200) processes one or more pictures, which may be frames, video fields or combinations of frames and fields. As used herein, the term "picture" generally refers to source, coded or reconstructed image data. For progressive video, a picture is a progressive video frame. For interlaced video, two complementary interlaced video fields can be encoded as an interlaced video frame or separate fields. The term "picture" can also indicate a video object plane that represents a video object at a given time or a region of interest in a larger image. The video object plane or region can be part of a larger image that includes multiple objects or regions of a scene.

The decoder system (200) includes a channel (210), which can represent storage, a communications connection, or another channel for coded data as input. The channel (210) produces coded data that has been channel coded. A channel decoder (220) can process the coded data. For example, the channel decoder (220) de-packetizes data that has been aggregated for transmission as a media stream, in which case the channel decoder can parse one or more syntax elements, signaled according to the syntax of the media transmission stream, that indicate size of coded data or other information used to adapt memory usage. Or, the channel decoder (220) separates coded video data that has been aggregated for storage as a file, in which case the channel decoder (220) can parse one or more syntax elements, signaled according to the syntax of the media storage file, that indicate size of coded data or other information used to adapt memory usage. Or, more generally, the channel decoder (220) can implement one or more media system demultiplexing protocols or transport protocols, in which case the channel decoder (220) can parse one or more syntax elements, signaled according to the syntax of the protocol(s), that indicate size of coded data or other information used to adapt memory usage.

The coded data (221) that is output from the channel decoder (220) is stored in a temporary coded data area (230) until a sufficient quantity of such data has been received. The coded data (221) includes coded pictures (231) and memory management control signals (232). The coded data that is aggregated in the coded data area (230) can contain, as part of the syntax of an elementary coded video bitstream, one or more syntax elements that indicate size of different types of coded data, spatial resolution of pictures, picture type information, or other information used to adapt memory usage. Or, the coded data that is aggregated in the coded data area (230) can include such syntax element(s) as part of media metadata relating to the coded video data (e.g., as parameters in one or more supplemental enhancement information ("SEI") messages).

In general, the coded data area (230) temporarily stores coded data (221) until such coded data (221) is used by the decoder (240). At that point, coded data for a coded picture (231) and memory management control signals (232) are transferred from the coded data area (230) to the decoder (240). As decoding continues, new coded data is added to the coded data area (230) and the oldest coded data remaining in the coded data area (230) is transferred to the decoder (240).

The decoder (240) periodically decodes a coded picture (231) to produce a corresponding decoded picture. As appropriate, when performing its decoding process, the decoder (240) may use one or more previously decoded pictures (269) as reference pictures for inter-picture prediction. The decoder (240) reads such previously decoded pictures (269) from the decoded picture buffer area (270). The decoder (240) includes multiple decoding modules that perform decoding tasks such as entropy decoding, inverse quantization, inverse frequency transforms and motion compensation. The exact operations performed by the decoder (240) can vary depending on compression format and implementation. The format of the input coded data can be a Windows Media Video format, VC-1 format, MPEG-x format (e.g., MPEG-1, MPEG-2, or MPEG-4), H.26x format (e.g., H.261, H.262, H.263, H.264), VP8/WebM format or other format.

Intra-picture decoding techniques decode a picture with reference to information within the picture. For intra-picture decoding of a picture, for example, the (240) decoder entropy decodes quantized transform coefficients for blocks of the picture. The decoder (240) inverse quantizes the transform coefficients and inverse frequency transforms the coefficients to reconstruct values for the blocks of the picture. The values can be sample values that represent the intensity of brightness or the intensity of a color component for a small, elementary region of the picture. Or, the values can be residual values for the blocks. The decoder (240) can perform spatial prediction of values of blocks from the reconstructed values of neighboring blocks, then combine the predicted values with residual values for the blocks. The samples of the picture are organized as arrays or planes, and may be buffered for use in motion compensation.

Inter-picture decoding techniques decode a picture with reference to a preceding and/or following picture (often called a reference or anchor picture) or pictures. For inter-picture decoding, for example, the decoder performs motion compensation for macroblocks, blocks, sub-blocks, etc. (generally, blocks) of a picture using motion vectors and reference picture identifiers for the respective blocks. The decoder also reconstructs residual values (using entropy decoding, inverse quantization, and inverse frequency transforms of coefficients) and combines the residual values with the motion-compensated prediction values. The samples of the picture are organized as arrays or planes, and may be buffered for use in motion compensation.

Figure 3A:
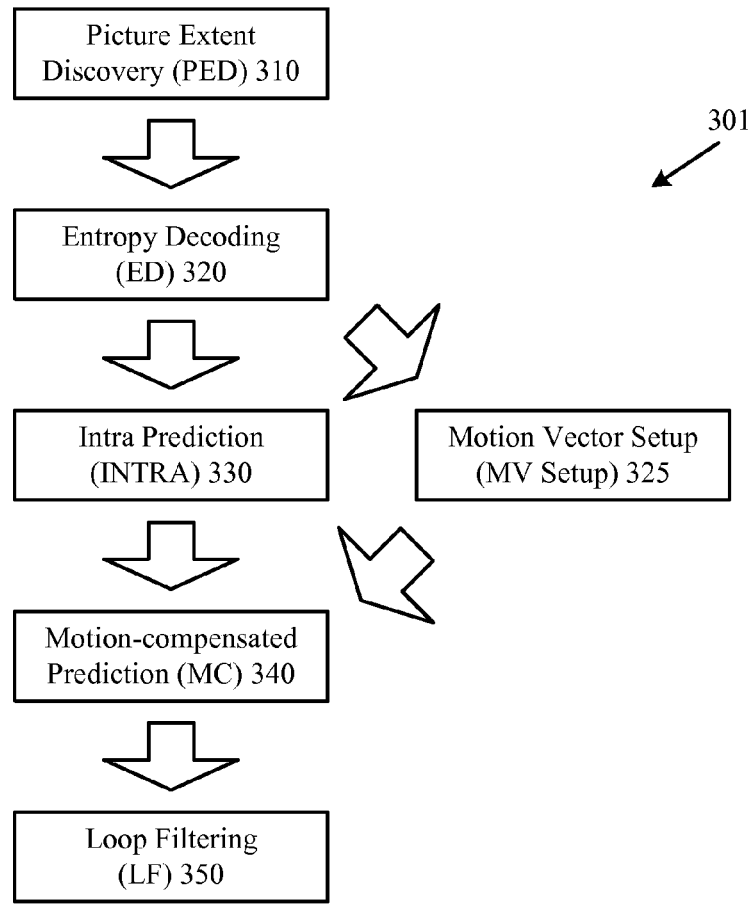
FIGS. 3a and 3b are diagrams showing decoding tasks in some described embodiments.

The decoder (240) can be implemented as a single-threaded software decoder, multi-threaded software decoder, hardware-accelerated decoder, or other type of decoder. FIG. 3a shows decoding tasks (301) for decoding a picture when the decoder (240) uses multi-threading software. A task scheduler distributes available tasks to different threads according to one of several available scheduling heuristics. An available task can process data for a picture, slice or other segment (collection of macroblocks).

As part of the picture extent discovery (PED) task (310), the decoder (240) finds a complete picture from the bit stream and initializes the parameters and data structures that will be used for decoding the picture. In the entropy decoding (ED) task (320), the decoder (240) entropy decodes transform coefficients, motion vectors and other side information with context-adaptive binary arithmetic decoding, context-adaptive variable length decoding or some other form of entropy decoding. To exploit the relative rarity of entropy decoded transform coefficients for intra-coded blocks in inter-coded pictures, the decoder (240) can buffer coefficients for intra-coded blocks separately from coefficients inter-coded blocks, as explained in Section IV.

In the motion vector setup (MV setup) task (325), the decoder (240) reconstructs motion vectors for blocks of a picture that has been encoded using inter-picture coding. In the motion-compensated prediction (MC) task (340), the decoder (240) reconstructs inter-coded content using motion compensation and combines the predicted values with reconstructed residual values. (The decoder (240) need not perform the MV setup (325) and MC (340) tasks for pictures that include only intra-coded content.) In the intra prediction (INTRA) task (330), the decoder (240) reconstructs intra-coded content using spatial intra prediction and combines the predicted values with reconstructed residual values. In the loop filtering (LOOP) task (350), the decoder (240) performs deblock filtering and other processing on decoded pictures.

Figure 3B:
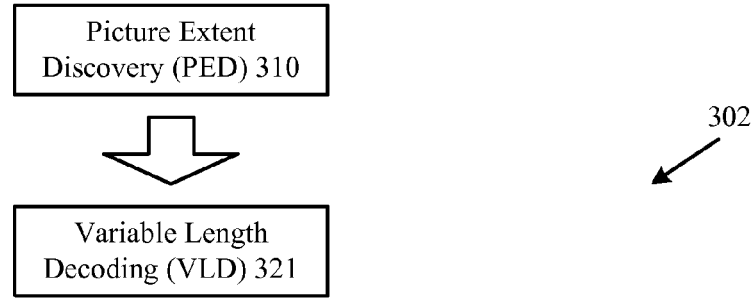

FIG. 3b shows decoding tasks (302) for decoding a picture when the decoder (240) uses hardware acceleration. With hardware acceleration, the decoder (240) offloads selected operations to a graphics processor or other specialized hardware. For example, in some configurations, a computer system includes a primary CPU as well as a graphics processing unit (GPU) or other hardware specially adapted for graphics processing. The decoder (240) uses the primary CPU as a host to control overall decoding and uses the GPU to perform operations that collectively require extensive computation. Typically, the decoder (240) controls overall decoding and performs some decoding operations (such as the PED task (310) in FIG. 3b) using a host CPU. The decoder (240) signals control information and other information to a device driver for a video accelerator (e.g., with GPU) across an acceleration interface. In FIG. 3b, the variable length decoding (VLD) task (321) represents performance of the ED operations, INTRA operations, MV setup operations, MC operations and LOOP operations using hardware acceleration.

Returning to FIG. 2, the memory (241) for the decoder (240) includes a coded data buffer area (250), side information buffer area (260) and decoded picture buffer area (270). A coded data buffer (251 . . . 25n) stores data for a coded picture (231). The number of coded data buffers (251 . . . 25n) depends on implementation. The size of the coded data buffers can vary adaptively during decoding, as explained in Section III.

A side information buffer (261 . . . 26n) stores side information used during the decoding of a picture. Different side information buffers can store different types of side information such as motion vectors, references picture indices, partition information that describes how macroblocks, blocks, sub-blocks, etc. are associated with motion vectors for motion compensation, slice identifiers, intra prediction mode information and/or other information used during decoding of a given picture. In some cases, the side information is also used in decoding of one or more other pictures that depend on the given picture. The size of side information buffers (261 . . . 26n) can vary depending on spatial resolution, as explained in Section III. In addition, the count of side information buffers (261 . . . 26n) can vary depending on GOP structure and the way content was encoded in pictures, as explained in Section III. In some cases, a decoder can release side information memory for a picture before image plane memory for the picture, as explained in Section V.

The one or more decoded picture buffers (271 . . . 27n) in the decoded picture buffer area (270) store reconstructed image plane information of pictures for output and/or use as reference pictures. The buffered pictures may be organized as frames. Typically, the reconstructed image plane information corresponds to luma and chroma samples values in arrays for a picture.

The way buffers are allocated, used and released depends on implementation. For example, the decoder can allocate a buffer from heap memory, use the buffer to store coded data, side information, reconstructed image plane information or other information for a picture, then release that buffer when the information is no longer needed such that the buffer is no longer used during decoding. More commonly, however, the decoder reuses buffers, allocating a given buffer from a pool of available buffers of an appropriate size (or from heap memory if no appropriate buffer has previously been allocated), using the buffer to store information for a picture, then releasing the buffer to back to the pool for use in subsequent decoding, only freeing the buffer when the buffer is no longer used in decoding or no longer suitable for decoding (e.g., wrong size). As used herein, the term "allocate" can refer to creation of a new memory buffer from heap memory or refer to assignment of an existing memory buffer from a pool of available memory buffers. Similarly, the term "release" can refer to freeing of a memory buffer, or it can refer to assignment of the memory buffer back to a pool of available memory buffers, for possible reuse in decoding. Different memory pools having different sizes of buffers can be associated with different types of data to be buffered. For example, a first memory pool can include buffers for coded data for pictures, a second memory pool can include fragment buffers for transform coefficients, a third memory pool can include buffers for motion vector side information, a fourth memory pool can include buffers for reconstructed image plane information, and so on. Initially, the decoder allocates buffers of appropriate sizes from heap memory, then releases the buffers to memory pools. If buffer size changes for a type of buffer, the decoder frees the buffers of that type in the memory pool and allocates buffers of the new size from heap memory. After buffer sizes have stabilized, the decoder mostly allocates memory from memory pools having buffers of appropriate sizes.

In some implementations, a buffer is an area of contiguous memory that has a start address referenced with a pointer, a maximum length and a current length. When a buffer is allocated from heap memory, its maximum length is specified, and a pointer to the buffer is returned. To read from the buffer, the decoder gets a lock on the buffer with a pointer to its memory address and its maximum length, reads data from the buffer, then unlocks the buffer. To write to the buffer, the decoder gets a lock on the buffer with a pointer to its memory address and its maximum length, writes data to the buffer, sets the current length for the data that was written to the buffer, and unlocks the buffer. Alternatively, a buffer is implemented in some other way.

The decoder (240) uses the memory management control signals (232) to manage the contents of the decoded picture buffer area (270) in order to identify any buffers (271, 272, etc.) with pictures that are no longer needed by the decoder (240) for use as reference pictures. For example, the decoder (240) uses the memory management control signals (232) to identify a picture buffer (271, 272, etc.) in which it can store a decoded picture. The decoder (240) stores the decoded picture in that picture buffer. The size of decoded picture buffers (271 ... 27n) in which reconstructed image plane information is stored can vary depending on spatial resolution, as explained in Section III. In some cases, a decoder can delay allocation of decoded picture buffers for image plane memory for pictures, as explained in Section V.

An output sequencer (280) uses the memory management control signals (232) to identify when the next frame to be produced in output order is available in the decoded picture buffer area (270). When the next frame (281) to be produced in output order is available in the decoded picture buffer area (270), it is read by the output sequencer (280) and output to the output destination (290) (e.g., display). In general, the order in which frames are output from the decoded picture buffer area (270) by the output sequencer (280) may differ from the order in which the frames are decoded by the decoder (240).

III. Content-Adaptive Memory Usage.

With content-adaptive memory usage, a video decoder adapts its memory usage to the content of a given video clip. Rather than allocate memory according to "worst case" assumptions for the video clip or maximum settings for the video decoder, the decoder allocates memory according to settings expected to be sufficient for decoding of the video clip. If appropriate, the decoder increases memory usage during decoding, potentially up to the worst-case assumptions for the video clip or maximum settings for the video decoder.

FIG. 4 shows an example technique (400) for adapting memory usage depending on a video clip, subject to limits on memory consumption. A video decoder such as the decoder (200) of FIG. 2 or other decoder can perform the technique (400).

To start, the decoder receives (410) at least part of the bitstream for a video clip. The decoder determines (420) first memory usage settings for decoding of the video clip. The decoder also determines (430) second memory usage settings different than the first memory usage settings. The second memory usage settings indicate one or more theoretical limits on memory usage according to a standard or format specification for decoding of the video clip. The second memory usage settings can also indicate limits on memory usage for a given computer system or video decoder. To determine the first and second memory usage settings, the decoder can analyze one or more syntax elements in the bitstream. In some cases, the first memory usage settings and/or the second memory usage settings depend at least in part on the analysis of the syntax element(s) in the bitstream.

In general, the first memory usage settings are expected to be sufficient for the decoding of the video clip. In contrast, the second memory usage settings are known to be sufficient for decoding of the video clip. Table 1 shows examples of first and second memory usage settings for certain types of memory used in video decoding. Alternatively, the decoder determines first and second memory usage settings for other and/or additional types of memory used in video decoding.

TABLE 1

Examples of First and Second Memory Usage Settings.

| first memory usage settings | second memory usage settings |
|---|---|
| expected bit rate per picture, which corresponds to an initial coded data buffer size that can dynamically grow | maximum bit rate per picture, which indicates maximum size of network access layer unit per picture and corresponds to maximum coded data buffer size according to a standard or format specification |
| based on spatial resolution for at least part of video clip, size of reconstructed image plane information buffers and size of side information buffers | size of reconstructed image plane information buffers and size of side information buffers at maximum spatial resolution supported by system |
| allocate only those side information buffers appropriate for type of picture and GOP structure | allocate side information buffers regardless of type of picture or GOP structure |

Returning to FIG. 4, during the decoding of the video clip, the video decoder adapts (440) memory usage based at least in part on the first memory usage settings and the second memory usage settings. The decoder initially sets memory usage according to the first memory usage settings. The decoder selectively increases memory usage during decoding, subject to limits in the second memory usage settings. Sections III.A, III.B and III.C describe different examples of adaptation of memory usage depending on the content of a video clip.

A. Adaptation of Coded Data Buffer Size Depending on Content.

Some video codec standards and formats define a maximum number of bits that can be used to encode a given picture of a video clip. The maximum number of bits of coded data for a picture can be defined in terms of the spatial resolution of the picture and a minimum compression ratio. For example, syntax elements in the bitstream for the clip can indicate the minimum compression ratio, the resolution per picture in terms of macroblock width and macroblock height, the number of samples per macroblock (which can vary for different chroma formats), and the number of bits per sample in raw form (which can vary for different bit depths). Such syntax elements can be signaled for the sequence or at some other layer of bitstream syntax, and in some cases the syntax elements can have default values if not signaled. Or, the maximum number of bits of coded data per picture can be set based on profile and/or level values for the video clip, set based on a maximum size for network access layer unit or other packet of media data, or set according to settings of the video decoder or computing system. In all of these cases, the maximum number of bits of coded data per picture is typically a worst-case value that usually is not reached for any given picture of the video clip in practice.

A coded data buffer (such as one of the coded data buffers (251 . . . 25n) in FIG. 2) stores data for a coded picture. Coded data for different slices of a picture can be buffered in the same coded data buffer or split between different coded data buffers, but potentially a picture has a single slice and all data for the picture is buffered in a single coded data buffer. Alternatively, a coded data buffer stores coded data for multiple coded pictures. Some decoders set coded data buffer size according to theoretical worst-case coded data size for a clip, decoder or computing system, regardless of the actual content of the video clip.

With content-adaptive sizing of coded data buffers, a video decoder sets the size of a coded data buffer or buffers to a value that is expected to be sufficient for decoding of a video clip. The coded data buffer size is set to a reasonable size (e.g., considering the spatial resolution of pictures and expected compression ratio, or using some other metric for estimating likely sizes of coded data for pictures of the video clip), which is much less than the theoretical worst-case size. The decoder dynamically increases the coded data buffer size as needed during decoding. Typically, even if the coded data buffer size grows at the beginning of decoding, the coded data buffer size stabilizes at a size that is sufficient for decoding even the largest coded picture actually in the video clip, and that size is much lower than the theoretical worst-case size possible for the clip. The decoder can still use a coded data buffer having the worst-case size if appropriate during decoding of the video clip, but reaches that coded data buffer size only rarely. In this way, the coded data buffer size adapts to the largest coded pictures actually in a given video clip, subject to the theoretical buffer size limit set for the clip, and memory usage is reduced in many decoding scenarios.

Content-adaptive sizing of coded data buffers can be used in single-threaded software implementations of decoding, multi-threaded software implementations of decoding, hardware-accelerated implementations of decoding or other implementations of decoding. The details of how coded buffer sizes are adapted can vary depending on implementation.

Figure 5:
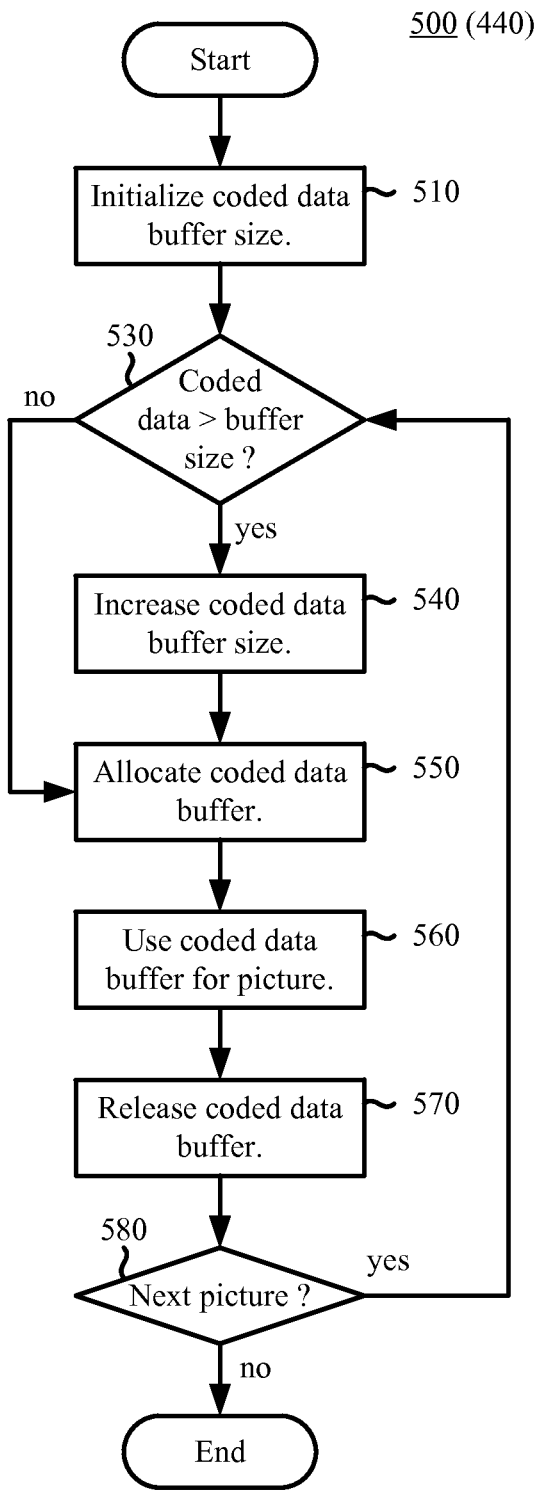
FIG. 5 is a flowchart showing an example technique for dynamically growing the size of a coded data buffer during decoding.

FIG. 5 shows an example technique (500) for dynamically growing the size of a coded data buffer during decoding. The example technique (500) is one possible approach to adapting memory usage according to the adaptation stage (440) of FIG. 4. The technique (500) of FIG. 5 can be used, for example, in single-threaded software implementations of decoding or hardware-accelerated implementations of decoding.

To start, the decoder initializes (510) a coded data buffer size according to the first memory usage settings. For example, the decoder determines the resolution for pictures in a video clip, which can be defined in terms of spatial resolution (e.g., a SD resolution such as 720×480 or HD resolution such as 1280×720 or 1920×1080), chroma format and bit depth. For that resolution, the decoder identifies a theoretical worst-case size for coded data buffer as the second memory usage settings. For the first memory usage settings, the decoder also estimates a likely-case size of coded data buffer for that resolution of pictures. For example, the decoder sets the coded data buffer size as a fraction such as ¼ or ⅓ of the worst-case coded data size.

The decoder dynamically grows the coded data buffer size during decoding when the encoded data for a given picture of the video clip is greater than the coded data buffer size, up to a theoretical limit size set according to the second memory usage settings. When it increases the coded data buffer size, the decoder can switch between multiple pre-determined coded data buffer sizes such as 100 KB, 200 KB, 400 KB, 800 KB, and so on, up to the maximum setting. Or, the decoder can incrementally increase the coded data buffer size only as needed, or the decoder can switch coded data buffer sizes in some other way.

The decoder allocates a coded data buffer having the coded data buffer size and uses the coded data buffer to store encoded data for each of one or more pictures of the video clip during decoding. The timing of how buffers are allocated, used and released during decoding depends on implementation.

For example, the decoder allocates a new coded data buffer having the current coded data buffer size from heap memory, stores coded data for one picture in the buffer, and releases the coded data buffer to free the buffer from further use in decoding when the picture has been decoded. In the technique (500) shown in FIG. 5, the decoder checks (530) if the coded data for the next picture to be decoded is greater than the coded data buffer size. If so, the decoder increases (540) the coded data buffer size. (If not, the coded data buffer size is unchanged.) The decoder allocates (550) a new coded data buffer having the current size from heap memory, uses (560) the coded data buffer to store the coded data for the picture in decoding, releases (570) the coded data buffer to free the buffer from further use in decoding when decoding for the picture has finished, and continues (580) with decoding for the next picture, if any. In practice, the timing of the use (560) and release (570) of the coded data buffer can vary if multiple pictures are in flight concurrently.

Alternatively, the decoder reuses one or more coded data buffers during decoding, freeing coded data buffer(s) if the coded data buffer size changes but otherwise allocating coded data buffer(s) from a memory pool and releasing them back to the pool. For example, the decoder checks (530) if the coded data for the next picture to be decoded is greater than the coded data buffer size. If not, the decoder allocates (550) a coded data buffer from the memory pool (or from heap memory if no appropriate buffer is available), uses (560) the coded data buffer to store the coded data for the picture in decoding, releases (570) the coded data buffer back to the memory pool when the coded data buffer is no longer used, and continues (580) with decoding for the next picture, if any. Otherwise (if the coded data for the picture is greater than the coded data buffer size), the decoder increases (540) the coded data buffer size, releases the current coded data buffer or buffers in the memory pool from further use in decoding (not shown in FIG. 5), allocates (550) a new coded data buffer having the increased size from heap memory, uses (560) the newly allocated buffer in decoding, releases (570) the buffer at the appropriate time (to the memory pool), and continues (580) with decoding for the next picture, if any.

In these examples, the coded data buffer size potentially increases during decoding but does not decrease during decoding. Alternatively, a decoder can also decrease coded data buffer size during decoding. For example, the decoder decreases coded data buffer size if coded picture size more than a threshold amount below the current data buffer size for more than a threshold number of pictures, where the thresholds depend on implementation.

FIG. 6 is a listing (600) that illustrates dynamic growth in size of a coded data buffer during decoding. Suppose a video clip includes 1280×720 pictures in 4:2:0 chroma format (four luma blocks and two chroma blocks per macroblock) with 8 bits per sample. In raw form, the picture includes 1382400 bytes (3600 macroblocks, with 384 samples per macroblock). If the minimum compression ratio is 1.5, the maximum number of bytes of coded data per picture is 921600 bytes, or 900 KB. The maximum number of bytes of coded data per picture can be even higher for a higher resolution such as 1920×1080, a different chroma format such as 4:2:2 or 4:4:4, a higher sample depth or a lower minimum compression ratio. This provides an example of a theoretical worst-case for memory usage per coded picture buffer.

In FIG. 6, the initial coded data buffer size is 200 KB. This is sufficient for the first 3 pictures, as the buffer is allocated from/released to the pool, but the coded picture size for the fourth picture is 225 KB. Therefore, the decoder increases the coded data buffer size to 300 KB, releases the 200 KB buffer to free it from further use in decoding and allocates a new coded data buffer having a size of 300 KB from heap memory. The new buffer is used/reused until the tenth picture (having a coded picture size of 350 KB) is reached. At this point, the decoder increases the coded data buffer size to 400 KB, releases the 300 KB buffer to free it from further use in decoding, and allocates a new 400 KB buffer from heap memory, which is sufficient for the remaining pictures. Thus, after a few memory releases and re-allocations from heap memory at the beginning of decoding, the coded data buffer size stabilizes at 400 KB for the clip, and the working set of buffers in the memory pool stabilizes. The difference between the theoretical worst-case coded data buffer size (here, 900 KB) and coded data buffer size used for the clip (here, 400 KB) can be significant, especially if multiple coded data buffers are allocated.

Figure 7:
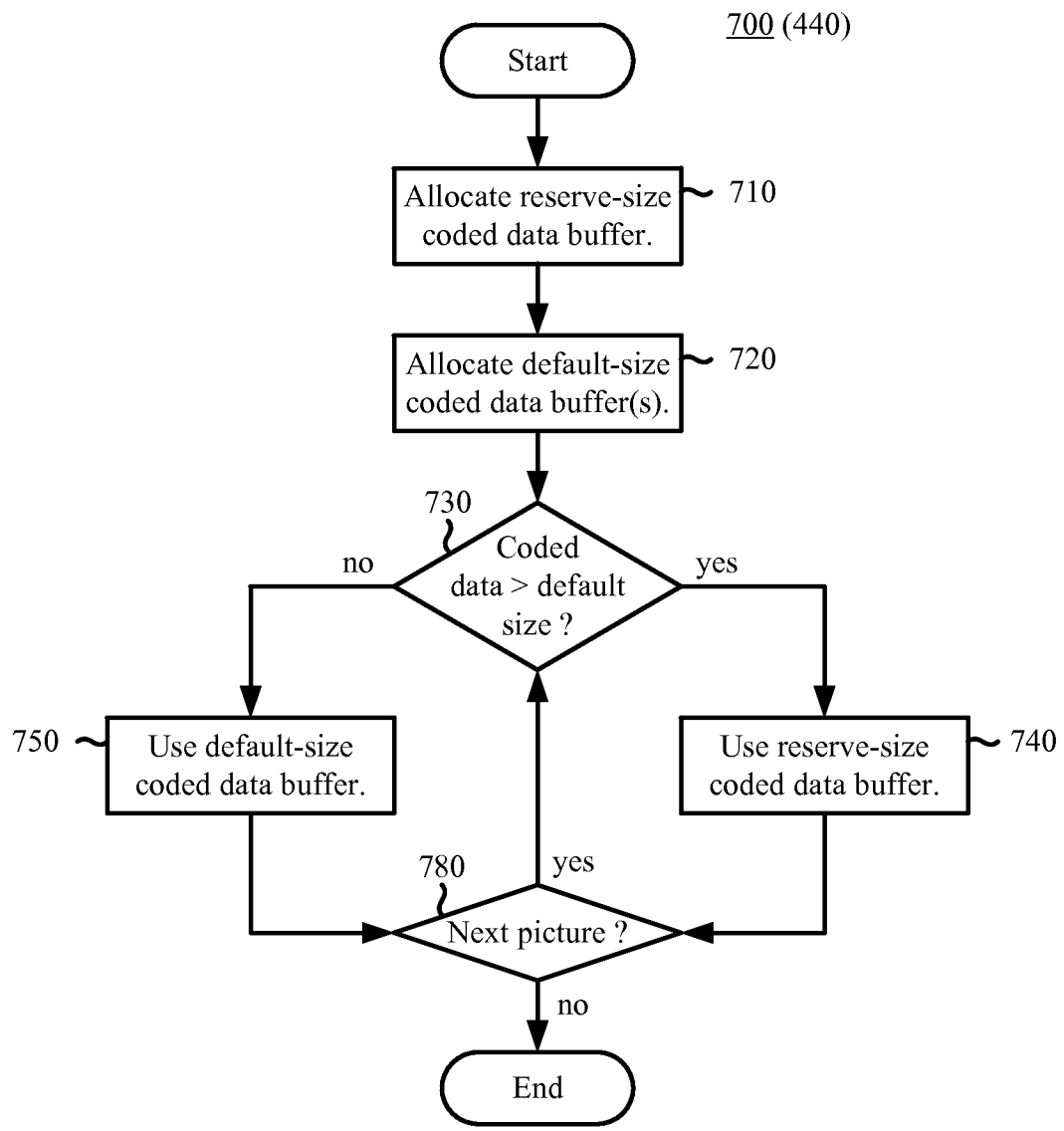
FIG. 7 is a flowchart showing an example technique for using a reserve size coded data buffer and one or more default size coded data buffers during multi-threaded decoding.

The technique shown in FIG. 5 is particularly well-suited for hardware-accelerated decoding. FIG. 7 is a flowchart showing an example technique (700) for using a reserve-size coded data buffer and one or more default-size coded data buffers during multi-threaded decoding. The example technique (700) is another possible approach to adapting memory usage according to the adaptation stage (440) of FIG. 4.

For multi-threaded decoding, the decoder allocates (710) a coded data buffer having a reserve size from heap memory. For example, the reserve size is set according to a theoretical limit size set according to the second memory usage settings and corresponds to a worse-case coded picture size. As explained above, the worse-case code picture size can depend on resolution of a picture and minimum compression ratio.

The decoder also allocates (720) one or more coded data buffers each having a default size from heap memory. For example, the default size is set according to the first memory usage settings and corresponds to an expected coded picture size. The default size can be ⅕, ⅒ or some other fraction of the theoretical worst-case size. The decoder can allocate n default-size coded data buffers having the default size when n pictures are in flight during decoding.

In this example, the default-size coded data buffers do not dynamically grow during decoding. Rather, the default-size buffers are used for decoding most pictures (for which coded picture size is less than the default size), and the decoder uses the reserve-size coded data buffer for unblocking when a coded picture has a size greater than the default size.

Thus, during decoding, the decoder uses (and reuses) the one or more default-size coded data buffers and/or the reserve-size coded data buffer, allocating an appropriate buffer from a memory pool for use in decoding, then releasing it back to the memory pool. The reserve-size coded data buffer stores encoded data for a given picture of the video clip if the encoded data for the picture is greater than the default buffer size. Otherwise, if the encoded data for the given picture is less than the default buffer size, a default-size coded data buffer stores the encoded data for the picture. In FIG. 7, the decoder checks (730) if the coded data size for a picture is greater than the default size. If so, the decoder uses (740) the reserve-size coded data buffer, allocating the buffer from an appropriate memory pool. If not, the decoder uses (750) the default-size coded data buffer, allocating the buffer from an appropriate memory pool. The decoder then continues (780) with the next picture, if any.

B. Accounting for Changes in Spatial Resolution when Adapting Buffer Size.

Some video codec standards and formats permit spatial resolution to change within a video clip. For example, the spatial resolution can change at an entry point or GOP, or even change from picture-to-picture within the clip. For side information and reconstructed image plane information, some decoders set buffer size according to largest spatial resolution supported by the decoder or computing system, regardless of the actual spatial resolution of the video clip.

A decoder can adapt to changes in spatial resolution by changing how buffers are allocated during encoding. For example, the worst-case size and likely size of coded data buffer can change when spatial resolution changes, if such sizes are defined in a way that depends on spatial resolution. Aside from coded data buffers, the size of buffers used for side information (such as motion vector information, reference index information, etc.) and reconstructed image plane information can change during decoding if spatial resolution changes. Of course, the buffer size for reconstructed image plane information directly depends on spatial resolution. Typically, side information is organized per macroblock or other unit of a picture, so the amount of side information that is buffered also depends on spatial resolution. Thus, for example, when a decoder decodes a video clip with CIF resolution (352×288 pictures), the decoder needs much less side information memory per picture than when decoding a video clip with an HD resolution such as 1920×1080.

Figure 8:
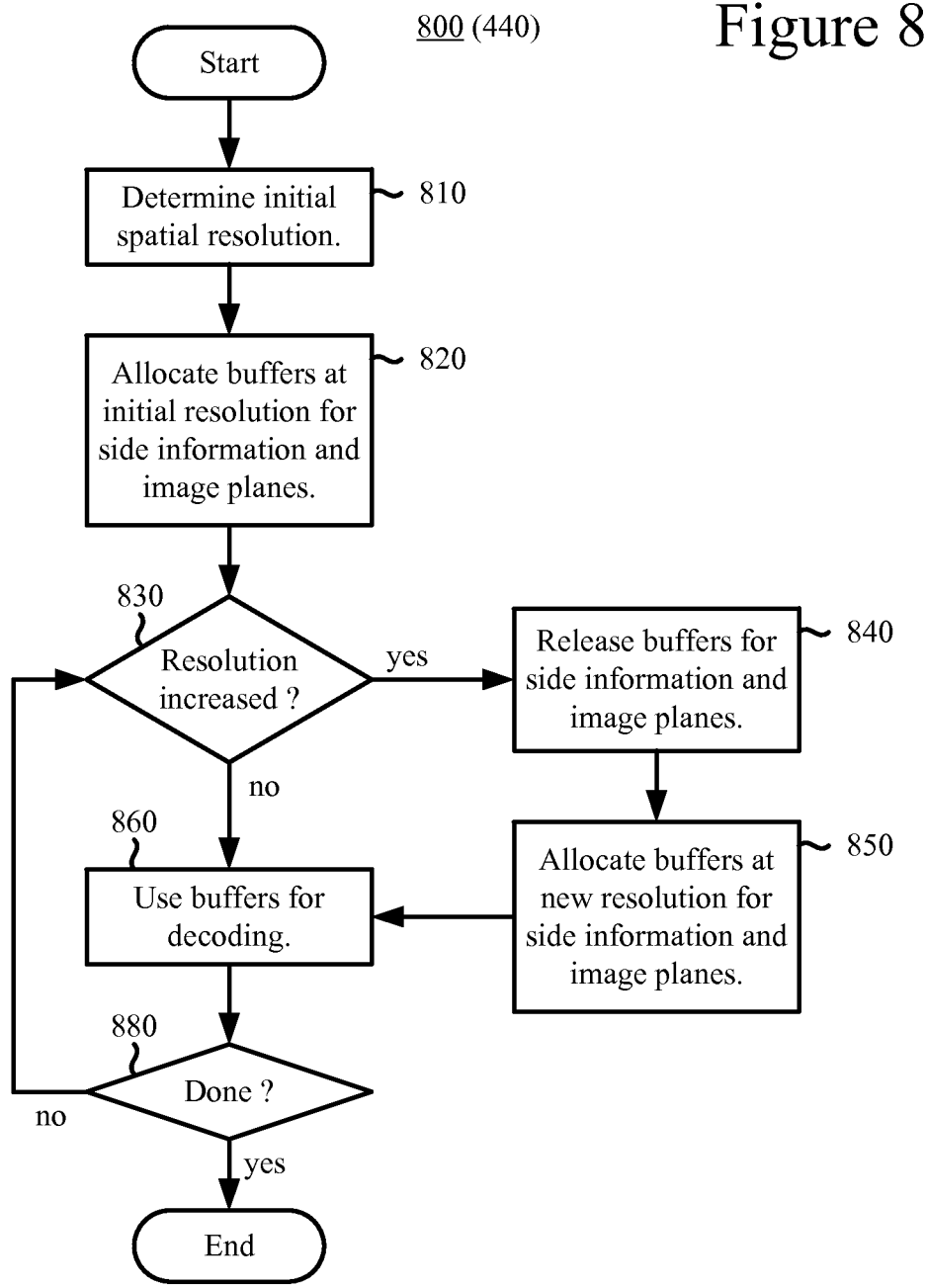
FIG. 8 is a flowchart showing an example technique for dynamically growing the size of buffers during decoding.

FIG. 8 is a flowchart showing an example technique (800) for dynamically growing the size of side information buffers and reconstructed image plane buffers during decoding. The example technique (800) is another possible approach to adapting memory usage according to the adaptation stage (440) of FIG. 4. The example technique (800) can be used during multi-threaded software decoding or other implementations of decoding.

The decoder determines (810) an initial spatial resolution. For example, the decoder determines the spatial resolution from syntax elements signaled in the bitstream for the clip. The decoder allocates (820) from heap memory one or more buffers for side information and one or more buffers for reconstructed image plane information at memory sizes appropriate for the initial spatial resolution for the clip (examples of first memory usage settings). The memory sizes can include a size for motion vector buffers, size for reference index information buffers, size for slice identifier buffers, size for intra prediction mode buffers, size for block partition buffers, and/or size for other side information buffers used during decoding. In this way, the buffer sizes depend on the spatial resolution for the given clip, as opposed to the maximum spatial resolution supported by the decoder or computing system.

During decoding, the decoder periodically checks (830) whether spatial resolution has increased. For example, the decoder checks for changes in spatial resolution at each entry point or GOP. Or, if sequence parameters set the spatial resolution, the decoder checks when the sequence parameters that apply change during decoding. If resolution is unchanged, the decoder continues using (860) (and reusing) the allocated buffers from appropriate memory pools during decoding, maintaining the memory sizes for side information and reconstructed image plane information.

On the other hand, if spatial resolution has increased (and the current set of buffers is too small for side information and reconstructed image plane information at the higher spatial resolution), the decoder increases the memory sizes for side information and reconstructed image plane information, subject to limits for the decoder or system (examples of second memory usage settings). The decoder releases (840) the set of buffers currently used for side information and reconstructed image plane information when those buffers are no longer being used, such that the buffers are freed from memory and no longer used in decoding. The decoder allocates (850) from heap memory new buffers for side information and reconstructed image plane information at the sizes appropriate for the new spatial resolution, and the decoder uses (860) (and reuses) such buffers from appropriate memory pools during decoding. The decoder continues (880) with the next pictures in the clip, if any. In this way, memory usage stabilizes at appropriate sizes for side information buffers and reconstructed image plane buffers for a given spatial resolution. Since the decoder reuses buffers for side information and reconstructed image plane information during decoding by allocating from/releasing to memory pools, the decoder can avoid re-allocation of memory from heap memory. (Alternatively, if the decoder completely frees and re-allocates buffers per picture for side information and image plane information, the decoder can still change buffer sizes for such information as shown in FIG. 8.)

In these examples, the buffer sizes for side information and reconstructed image plane information potentially increase during decoding but do not decrease during decoding. Alternatively, a decoder can also decrease the buffer sizes during decoding. For example, the decoder decreases the buffer sizes if spatial resolution has decreased during decoding.

C. Adaptation of Memory Usage to Gop Structure and/or Picture Type.

For side information, some decoders assign buffers to pictures regardless of the way content of the pictures has been encoded. The types of side information used during decoding can vary, however, depending on how the pictures were encoded.

A decoder can adapt to changes in group of picture (GOP) structure and/or picture type by changing how side information buffers are allocated to pictures during decoding. Some standards or video formats use a picture type syntax element to indicate the picture type of a picture. In other standards or video formats, such as the H.264 standard, the picture type of a picture can be inferred from the types of slices or other content in the picture. During encoding, an encoder commonly follows a GOP structure, which is a pattern of picture types, to balance factors such compression efficiency, random access and temporal scalability. Adjusting memory usage depending on GOP structure and/or picture type is another possible approach to adapting memory usage according to the adaptation stage (440) of FIG. 4.

Memory usage for side information is different when decoding different types of pictures. For example, if a picture is an I picture (or, includes only I slices or SI slices according to the H.264 standard), then no motion vector buffers, reference index buffers, etc. are used. If a picture is a P picture (or, includes only P slices, I slices, SP slices or SI slices according to the H.264 standard), then motion vector information is buffered for up to one set of motion vectors and reference indices per macroblock, block, etc., and some partition information is buffered. If a picture is a B picture (or, includes at least some B slices according to the H.264 standard), then full side information is buffered, including up to two sets of motion vectors and reference indices per macroblock, block, etc. The following table shows some different types of side information used for different types of pictures.

TABLE 2

Examples of Side Information for Different Types of Pictures.

|  | Motion Vector Info | RefIdx | Prediction Mode/ Partition Type |
|---|---|---|---|
| I picture | n/a | n/a | 1 set |
| P picture | 1 set per partition | 1 set per partition | 1 set |
| B picture | 2 sets per partition | 2 sets per partition | 1 set |

Based on GOP structure and picture types for at least part of the video clip, the decoder can set usage of memory for motion vectors, usage of memory for reference index information and usage of memory for other side information (examples of first memory usage settings). For a picture that includes only intra-coded content, the decoder uses memory for reconstructed image plane information but uses no memory for motion vectors and no memory for reference index information. For a picture that includes at least some uni-directionally predicted content but no bi-directionally predicted content, the decoder uses memory for reconstructed image plane information, memory for one set of motion vector information per partition and memory for one set of reference index information per partition. For a picture that includes at least some bi-directionally predicted content, the decoder uses memory for reconstructed image plane information, memory for two sets of motion vector information per partition and memory for two sets of reference index information per partition. By allocating side information buffers for pictures of a GOP based on the picture types of the pictures, the decoder can reduce memory usage to levels appropriate for the pictures and GOP structure. In this way, the decoder can reduce the working set of memory for motion vectors, reference indices and other side information in memory pools for the respective types of side information, and thereby reduce overall memory usage.

IV. Memory Usage for Residual Coefficients.

In general, a decoder reconstructs transform coefficients for blocks of residual values that resulted (during encoding) from motion compensation or spatial intra prediction. The way that the decoder handles entropy decoded residual coefficients can depend on implementation. For example, when a decoder uses multi-threading software and organizes decoding tasks as shown in FIG. 3a, the decoder transfers entropy decoded residual coefficients for intra-coded blocks from the ED task (320) to the INTRA task (330), and the decoder transfers entropy decoded residual coefficients for inter-coded blocks from the ED task (320) to the MC task (340).

In some video codec standards and video formats, an inter-coded picture such as a P picture or B picture can include a mix of inter-coded content and intra-coded content. To achieve effective compression, most macroblocks, blocks, sub-blocks etc. (generally, blocks) of an inter-coded picture are encoded using motion compensation or another form of inter-coding. Intra coding of blocks of the inter-coded picture may be permitted, but usually consumes more bits than inter-coding. For that reason, in most cases, a small fraction (e.g., 10% or less) of blocks of an inter-coded picture are intra-coded. For an intra-coded picture, a decoder as in FIG. 3a transfers residual coefficients from the ED task (320) to the INTRA task (330). For an inter-coded picture, the decoder may transfer some residual coefficients from the ED task (320) to the INTRA task (330) and/or transfer some residual coefficients from the ED task (320) to the MC task (340). The decoder could allocate a full-size buffer for residual coefficients of intra-coded blocks to guard against the possibility of all blocks being intra-coded, and the decoder could also allocate a full-size buffer for residual coefficients of inter-coded blocks to guard against the possibility of all blocks being inter-coded. For the typical pattern of occurrence for intra-coded blocks of inter-coded pictures, this manner of memory allocation is inefficient.

With adaptive buffering of transform coefficients for intra-coded blocks and inter-coded blocks, a decoder exploits the dominance of inter-coded blocks in inter-coded pictures to reduce memory usage. The decoder uses one buffer size for a buffer to store transform coefficients for intra-coded blocks of inter-coded pictures, and the decoder uses another, larger buffer size for a buffer to store transform coefficients for inter-coded blocks of inter-coded pictures. For example, the buffer for transform coefficients for intra-coded blocks is 8 to 10 times smaller than the buffer for transform coefficients for inter-coded blocks.

FIG. 9 shows an example technique (900) for adapting memory usage by using different buffer sizes for intra-coded content and inter-coded content of an inter-coded picture. A video decoder such as the decoder (200) of FIG. 2 or other decoder can perform the technique (900).

To start, the decoder receives (910) at least part of a bitstream for a video clip. The video clip includes at least one picture encoded using inter-picture coding. The decoder determines (920) first memory usage settings for decoding intra-coded content of the inter-coded picture(s). The decoder also determines (930) second memory usage settings for decoding inter-coded content of the inter-coded picture(s). For example, the first memory usage settings include a buffer size for intra-coded content of the inter-coded picture(s), and the second memory usage settings include a different buffer size for inter-coded content of the inter-coded picture(s).

During decoding of the video clip, the decoder adapts (940) memory usage based at least in part on the first and second memory usage settings. For example, the decoder allocates a first buffer according to the first memory usage settings (from heap memory or from an appropriate memory pool) and, in the first buffer, stores entropy decoded transform coefficients for intra-coded blocks of a given picture. The transform coefficients can be for intra prediction residual values or sample values of the intra-coded blocks. The decoder also allocates a second buffer (larger than the first buffer, from heap memory or from an appropriate memory pool) according to the second memory usage settings and, in the second buffer, stores entropy decoded transform coefficients for inter-coded blocks of the given picture. For the inter-coded blocks, the transform coefficients can be for motion-compensated prediction residual values or other residual values. The decoder can dynamically grow size for the first buffer and/or size for the second buffer during decoding.

The decoder can further reduce memory usage by exploiting the relative sparseness of non-zero residual coefficient values. In typical video decoding scenarios, non-zero residual coefficients are relatively rare due to lossy compression. In a worst-case situation, each residual coefficient is non-zero but, in most cases, only a small fraction of the residual coefficients are non-zero (mostly due to quantization during encoding). Therefore, in some implementations, instead of storing each residual coefficient value whether zero or non-zero, the decoder stores the position, absolute value and sign per non-zero coefficient value in a fragment buffer, then dynamically adds another fragment buffer from a linked list, if needed. Such sparse storage reduces memory consumption compared to storage of every residual coefficient. For example, the decoder allocates (from heap memory or an appropriate memory pool) a fragment buffer that is, e.g., 10% to 30% of the worse-case size. To address the worst-case scenario (all non-zero residual coefficients), the decoder periodically checks (e.g., after decoding completes for each macroblock) whether another fragment buffer should be allocated to expand the overall buffer size, up to the worse-case size for the buffer for residual coefficients. For additional details about the use of fragment buffers for residual coefficients in general, see U.S. Patent Application Publication No. 2009/0003447. The size of individual fragment buffers can be the same for intra-coded blocks and inter-coded blocks, even if more fragment buffers are initialized for inter-coded blocks.

FIG. 10 illustrates a numerical example (1000) of different buffer sizes for intra-coded content and inter-coded content of inter-coded picture. For a given picture, the decoder initially allocates a 50 KB fragment buffer for residual coefficients of intra-coded blocks and allocates a 500 KB fragment buffer (or buffers) for residual coefficients of inter-coded blocks, where the worst-case sizes for the two buffers are 2 MB and 2 MB, respectively. The fragment buffers can be allocated from heap memory or appropriate memory pools, and different memory pools can be used for intra-coded blocks and inter-coded blocks. For the first portion of macroblocks of the inter-coded picture (10 KB for coefficients of intra-coded blocks and 75 KB for coefficients of inter-coded blocks), the allocated buffers are sufficient. (The decoder can check whether buffer size is sufficient every macroblock. In FIG. 10, the decoder checks less frequently so as to more succinctly show growth in buffer size.) For the next portion (50 KB for coefficients of intra-coded blocks and 100 KB for coefficients of inter-coded blocks), the allocated buffers are not sufficient. The decoder therefore allocates a new 50 KB fragment buffer for coefficients of intra-coded blocks, from heap memory or a memory pool. These buffers are sufficient, for the cumulative totals of memory used, until the decoder encounters a portion with 20 KB of coefficients for intra-coded blocks and 75 KB of coefficients for inter-coded blocks, at which point the decoder allocates another 50 KB fragment buffer for coefficients of intra-coded blocks. The decoder continues in this way, dynamically growing fragment buffers as needed, up to a limit size that depends, for example, on amount of coefficient data possible per block. If the size of a buffer would ever be greater than the limit size, the bitstream is illegal and decoding can stop.

V. Accelerating Memory Release and Delaying Memory Allocation.

Different types of memory have different patterns of lifetime during decoding. This can result in very different working sets and overall memory usage for the different types of memory. For example, for a multi-threaded decoder with decoding tasks as shown in FIG. 3a, a reconstructed image plane information buffer has a very long lifetime, starting from a picture's MC task (340) and ending at a deletion command for decoded picture buffer (DPB) management, after the picture has been output for display. On the other hand, side information buffers for motion vectors, reference indices, intra prediction modes, slice identifiers, etc. potentially have a different lifetime, starting from a picture's ED task (320) and ending when the picture is marked as "not used for reference." A picture can be marked as "not used for reference" much sooner than the deletion command for that picture. Nevertheless, some implementations of decoders release side information and reconstructed image plane buffers for a picture at the same time—upon the deletion command for the picture.

With adaptive early release of side information buffers, a decoder releases side information buffers for a picture earlier than the reconstructed image plane information buffer for the picture. For example, the decoder releases side information buffers for a picture when the picture is no longer used as a reference picture. The reconstructed image plane buffer might be released much later, after the picture has been output for display. This can decrease the size of the working set for side information memory, so that the working set for side information memory is proportional to the number of reference frames plus number of pictures in flight for current decoding (as opposed to the size of the decoded picture buffer plus number of pictures in flight for current decoding).

Figure 11A:
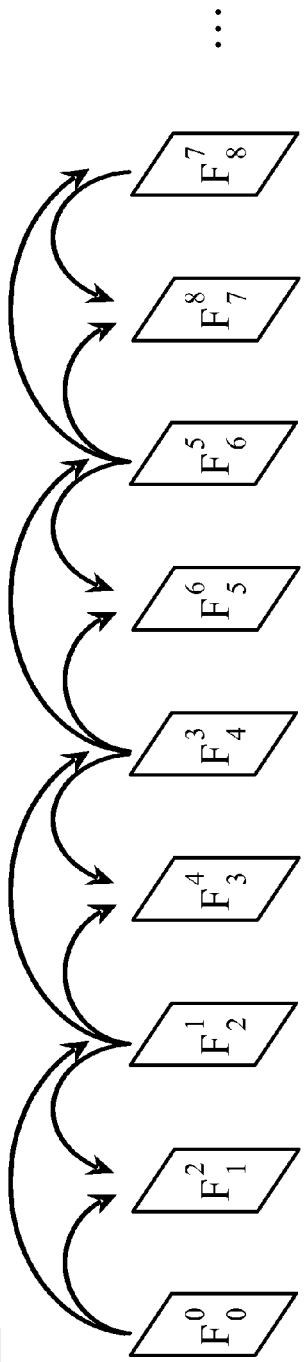
FIGS. 11a and 11b are diagrams showing coded order and output order for frames in several example series.
Figure 11B:
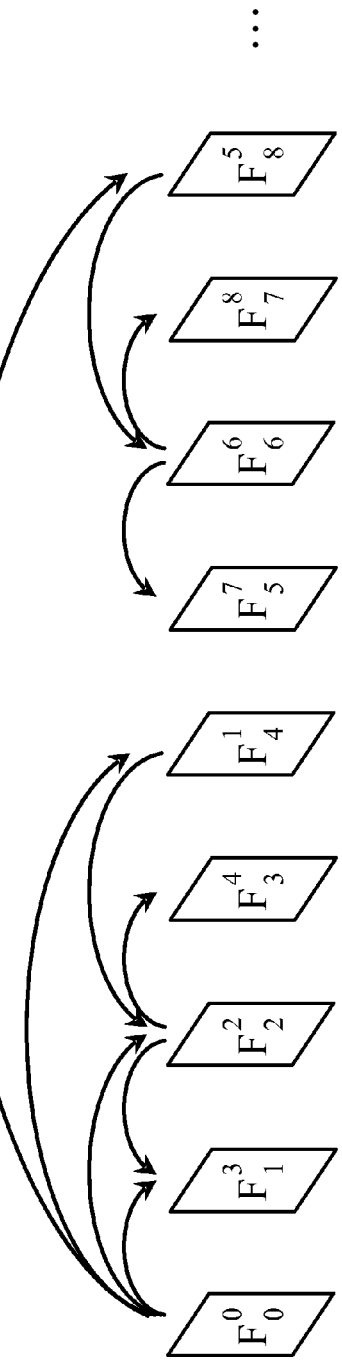

FIGS. 11a and 11b illustrate two series (1101, 1102) of frames having different inter-frame dependencies, different coded orders in the bitstream and different output orders. The second series (1102) shows opportunities for early release of side information memory. In FIGS. 11a and 11b, for a given frame $F_j^k$ the subscript j indicates position of the frame in output order and the superscript k indicates position of the frame in coded order. The frames are shown in output order—the output order subscript value increases from left to right. Arrows illustrate inter-frame dependencies for motion compensation, according to which preceding frames in coded order may be used for prediction of subsequent frames in coded order. For simplicity, FIGS. 11a and 11b show inter-frame dependencies at the frame level (and not at the level of macroblocks, blocks, etc. at which reference frames can change), and FIGS. 11a and 11b show at most two frames as reference frames for a given frame. In practice, in some implementations, different macroblocks, blocks, etc. in a given frame can use different reference frames, and more than two reference frames can be used for the given frame.

In FIG. 11a, the series (1101) includes nine frames. The third frame $F_2^1$ in output order uses the first frame $F_0^0$ as a reference frame, the fifth frame in $F_4^3$ in output order uses the third frame $F_2^1$ as a reference frame, and so on for the seventh and ninth frames. The remaining frames use a preceding frame and following frame as reference frames. During decoding, the frame $F_0^0$ is decoded first, followed by the frame $F_2^1$, followed by the frame $F_1^2$, etc. The series (1101) does not show significant opportunities for early release of side information memory.

In FIG. 11b, the series (1102) includes nine frames with different frame dependencies. The frame $F_4^1$ depends on the frame $F_0^0$ as a reference frame, and the frame $F_2^2$ depends in turn on the frame $F_4^1$ as a reference frame. After the frame $F_2^2$ has been decoded, the side information for the frame $F_4^1$ is no longer used but the frame $F_4^1$ has not been displayed. At this point, the decoder can release side information buffers for the frame $F_4^1$, even if the decoder maintains the reconstructed image plane information buffer for the frame $F_4^1$. Similarly, the decoder can release side information buffers for the frame $F_8^5$ earlier than it releases the reconstructed image plane information buffer for the frame $F_8^5$.

Figure 12:
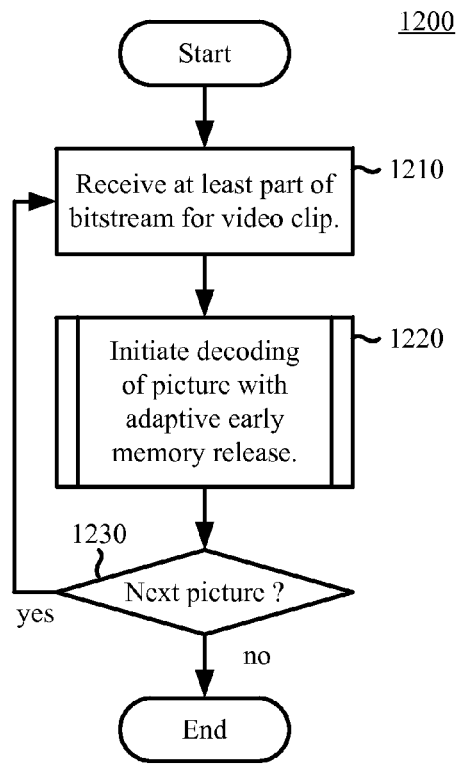
FIGS. 12 and 13 are flowcharts showing an example technique for video decoding with adaptive early release of memory for side information.
Figure 13:
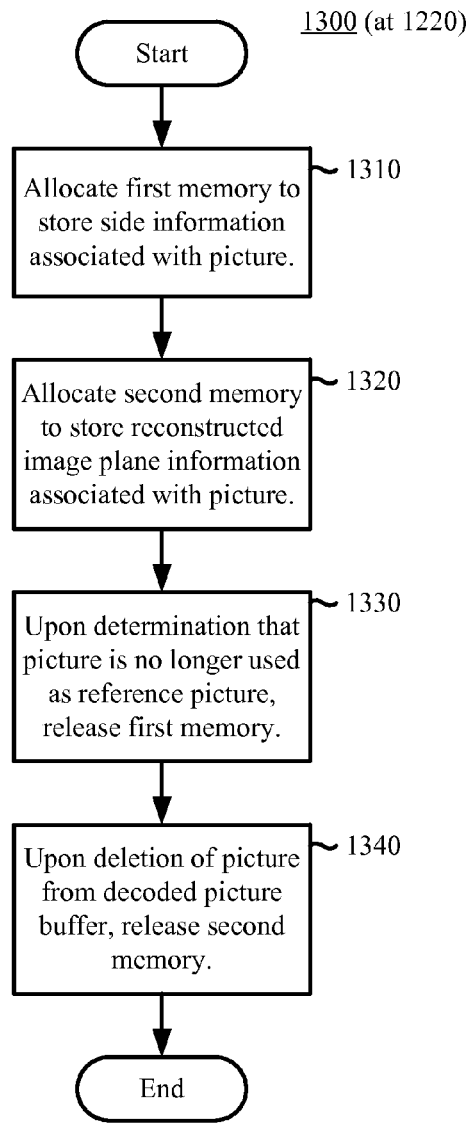

FIGS. 12 and 13 show an example technique (1200) for adaptive early release of side information memory. A video decoder such as the decoder (200) of FIG. 2 or other decoder can perform the technique (1200).

The decoder receives (1210) at least part of a bitstream for a video clip. The decoder then initiates decoding (1220) of a picture of the video clip. FIG. 13 shows an example (1300) of the decoding (1220) acts for one picture. When multiple pictures are concurrently decoded, the acts shown in FIG. 13 can be interleaved for different pictures. The decoder continues (1230) with the next picture, if any.

In the technique (1300) shown in FIG. 13, the decoder allocates (1310) first memory for storing side information associated with the picture. For example, the decoder allocates the first memory during entropy decoding for the picture. Initially, the first memory may be allocated from heap memory, but it is expected that the first memory will eventually be allocated from an appropriate memory pool. The decoder also allocates (1320) second memory for storing reconstructed image plane information associated with the picture. Again, the second memory may initially be allocated from heap memory, but it is expected that the second memory will eventually be allocated from an appropriate memory pool. For example, the decoder allocates the second memory during motion compensation or intra prediction for the picture. Alternatively, the decoder allocates the first memory and/or second memory at other times.

The types of side information buffers that are allocated can depend on picture type. For example, for an inter-coded picture, the side information includes motion vector information, reference index information, slice identifier information, mode information and partition information. In this case, the first memory includes a buffer for motion vector information, a buffer for reference index information, a buffer for slice identifier information, a buffer for mode information and a buffer for partition information. Or, for an intra-coded picture, the side information includes slice identifier information and mode information, and the first memory includes a buffer for slice identifier information and a buffer for mode information. Alternatively, the memory is adapted for other and/or additional kinds of side information. Some types of side information for a given picture, in addition to their use in decoding the picture itself, can be used during decoding of other pictures that use the given picture as a reference picture. For example, motion vector information, reference index information and partition information for a given picture can be used in decoding other pictures.

Upon determination that the picture is no longer to be used for reference in motion compensation during subsequent decoding, the decoder releases (1330) the first memory. Typically, the decoder releases the first memory to an appropriate memory pool for reuse in later allocations of first memory.

For example, for a picture that has been used as a reference picture, the decoder releases the first memory when the picture is no longer used for reference. This event can be indicated with a memory management control signal (explicit signaling) or derived according to rules for marking a picture as unused for reference (e.g., sliding window method in the H.264 standard). If a given picture is never used as a reference picture, the release of the first memory can happen even sooner—when the decoder finishes decoding the given picture. Also, some types of side information for a given picture can be released even sooner. If side information is not a type used in decoding other pictures, its side information memory can be released as soon as decoding for the given picture is finished, even if the given picture is still used as a reference picture.

Upon deletion of the picture from a decoded picture buffer, the decoder releases (1340) the second memory. Typically, the decoder releases the second memory to an appropriate memory pool for reuse in later allocations of second memory. For example, the decoder releases reconstructed image plane information for the picture after the picture has been output for display.

FIG. 14 illustrates a numerical example (1400) of adaptive early release of side information memory for the series (1102) shown in FIG. 11b. The example (1400) shows interleaving of memory allocation and release operations for different frames during decoding as multiple frames are concurrently decoded. In particular, for the frames shown in FIG. 11b, the example (1400) shows the difference between the release of side information buffers for frame $F_4^1$ and the release of the reconstructed image plane buffer for $F_4^1$. The side information buffers for frame $F_4^1$ can be released (to memory pools) as soon as the frame $F_4^1$ is no longer used as a reference frame, which is earlier than the time the frame $F_4^1$ is output for display. Also, although not shown in FIG. 14, for types of side information not used for a reference picture, side information memory can be released as soon as a given picture is decoded, even if other types of side information are buffered as long as the given picture is used as a reference picture.

The decoder can also delay allocation of memory during decoding, in some cases, to reduce overall memory usage. For example, during multi-threaded decoding, the decoder can set the priority of tasks whose completion enables release of reconstructed image plane memory higher than the priority of tasks in which reconstructed image plane memory is allocated. Then, during decoding, tasks whose completion enables release of such memory will be scheduled ahead of tasks in which such memory is allocated. With reference to the tasks shown in FIG. 3a, for example, the decoder sets the MC (340) and LF (350) tasks to have higher priority than the PED (310) and ED (320) tasks.

VI. Results.

In combination, the memory management techniques described herein can dramatically reduce memory consumption without loss in decoding performance (throughput, speed, etc.), or with slightly improved decoding performance due to better memory locality. Most of the memory management techniques can be applied in single-threaded software decoding, multi-threaded software decoding or hardware-accelerated decoding. The reduction in memory usage is especially noticeable when multiple clips are concurrently decoded.

For CIF video, in some playback scenarios, overall memory usage is reduced from 50 MB to 12 MB due to reductions in memory usage by the video decoder. For SD video (640×480), in some decoding scenarios, memory usage is reduced from 95 MB to 45 MB. For HD video (1920×1088), for some decoding scenarios with 3 MB raw HD video pictures, the worst-case memory usage for a compressed picture may be 4.5 MB, but the usual case memory usage is less than 300 KB, even at very high bitrates such as 38 Mbps for HD resolution for a saving of 4.2 MB. With sparse storage and smaller fragment buffer size for transform coefficients in intra-coded blocks, the decoder reduces memory usage by 10-15 MB at HD resolution in 4-thread decoding, and the decoder saves about 10 MB of memory with early release of side information. With delayed allocation of image plane buffers through memory-efficient task scheduling, the decoder further reduces memory consumption at HD resolution by 3-6 MB or more, depending on the number of threads.

In one test system, H.264 video clips in video tags of Web pages were decoded and rendered using a video decoder and Web browser. The test system included four processing cores, 2 gigabytes of system memory and a video card that supported hardware acceleration. For comparison purposes, video clips at different spatial resolutions QVGA, SD and HD were decoded, and the video clips were decoded using multi-threaded software decoding ("sw" decoding mode) and also using hardware-accelerated decoding ("vld" decoding mode). The following table shows reduction in memory usage per video tag/video clip due to the memory management techniques described herein. Memory usage is indicated in MBs per video tag/video clip.

TABLE 3

Reductions in Memory Usage.

| Resolution - Mode | Old Memory Usage Per Clip | New Memory Usage Per Clip | Difference in Memory Usage |
| --- | --- | --- | --- |
| HD - vld | 194 | 83 | −111 |
| HD - sw | 188 | 127 | −61 |
| SD - vld | 70 | 30 | −40 |
| SD - sw | 66 | 30 | −36 |
| QVGA - vld | 50 | 16 | −34 |
| QVGA - sw | 47 | 13 | −34 |

For the tests shown in Table 3, memory usage is reduced by approximately 30% to 70%, depending on spatial resolution and video decoding mode.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system that implements a video decoder, a method comprising:
receiving at least part of a bitstream for a video clip;
determining first memory usage settings for decoding of the video clip;
determining second memory usage settings different than the first memory usage settings, the second memory usage settings indicating one or more theoretical limits on memory usage according to a standard or format specification for decoding of the video clip; and
during the decoding of the video clip, adapting memory usage based at least in part on the first memory usage settings and the second memory usage settings, wherein the memory usage is initially set according to the first memory usage settings, and wherein the memory usage is increased during the decoding subject to the one or more theoretical limits in the second memory usage settings.

2. The method of claim 1 wherein the first memory usage settings are expected to be sufficient for the decoding of the video clip, and wherein the second memory usage settings are known to be sufficient for decoding of the video clip.

3. The method of claim 1 further comprising:
analyzing one or more syntax elements in the bitstream, wherein the second memory usage settings depend at least in part on the analysis of the one or more syntax elements.

4. The method of claim 1 wherein the adapting memory usage includes:
initializing a coded data buffer size according to the first memory usage settings;
dynamically growing the coded data buffer size during the decoding when the encoded data for a given picture of the video clip is greater than the coded data buffer size, up to a theoretical limit size set according to the second memory usage settings;
allocating a coded data buffer having the coded data buffer size; and
using the coded data buffer to store encoded data for each of one or more pictures of the video clip during the decoding.

5. The method of claim 4 wherein the increasing includes switching between multiple pre-determined coded data buffer sizes.

6. The method of claim 1 wherein the computing system uses multiple threads for the decoding, and wherein the adapting memory usage includes:
allocating one or more default coded data buffers each having a default coded data buffer size according to the first memory usage settings;
allocating a reserve coded data buffer having a reserve coded data buffer size according to a theoretical limit size set according to the second memory usage settings;
using the one or more default coded data buffers and the reserve coded data buffer during the decoding, wherein the reserve coded data buffer stores encoded data for a given picture of the video clip if the encoded data for the given picture is greater than the default coded data buffer size, and one of the one or more default coded data buffers stores the encoded data for the given picture if the encoded data for the given picture is less than the default coded data buffer size.

7. The method of claim 1 wherein the second memory usage settings include maximum bit rate per picture, the maximum bit rate per picture indicating maximum size of network access layer unit for one picture of the video clip.

8. The method of claim 1 wherein the first memory usage settings include, based on spatial resolution of at least part of the video clip, size of memory for side information and size of memory for reconstructed image plane information, and wherein the adapting memory usage includes:
allocating one or more side information buffers according to the size of memory for side information; and
allocating a reconstructed picture buffer according to the size of memory for reconstructed image plane information.

9. The method of claim 8 wherein the size of memory for side information includes size of memory for motion vectors and size of memory for reference index information.

10. The method of claim 8 wherein the adapting memory usage further includes:

if the spatial resolution increases during the decoding of the video clip, increasing the size of memory for side information and the size of memory for reconstructed image plane information; and
if the spatial resolution decreases during the decoding of the video clip, maintaining the size of memory for side information and the size of memory for reconstructed image plane information.

11. The method of claim 1 wherein the first memory usage settings include, based on group of picture structure and picture types for at least part of the video clip, use of memory for motion vectors and use of memory for reference index information.

12. The method of claim 11 wherein the adapting memory usage includes:
for a picture that includes only intra-coded content, using memory for reconstructed image plane information but using no memory for motion vectors and no memory for reference index information;
for a picture that includes at least some uni-directionally predicted content but no bi-directionally predicted content, using memory for reconstructed image plane information, memory for one set of motion vector information per partition and memory for one set of reference index information per partition; and
for a picture that includes at least some bi-directionally predicted content, using memory for reconstructed image plane information, memory for two sets of motion vector information per partition and memory for two sets of reference index information per partition.

13. The method of claim 1 wherein the decoding comprises, for each of plural pictures of the video clip:
allocating first memory for storing side information associated with the picture;
allocating second memory for storing reconstructed image plane information associated with the picture;
upon determination that the picture is no longer to be used for reference in motion compensation during subsequent decoding, releasing the first memory; and
upon deletion of the picture from a decoded picture buffer, releasing the second memory.

14. The method of claim 13 wherein the side information includes motion vector information, reference index information, slice identifier information, mode information and partition information, and wherein the first memory includes a buffer for motion vector information, a buffer for reference index information, a buffer for slice identifier information, a buffer for mode information and a buffer for partition information.

15. The method of claim 13 wherein the side information includes slice identifier information and mode information, and wherein the first memory includes a buffer for slice identifier information and a buffer for mode information.

16. The method of claim 13 wherein, for each of the plural pictures, the first memory is allocated during an entropy decoding task for the picture and the second memory is allocated during a motion compensation task or intra decoding task for the picture.

17. The method of claim 13 wherein the computing system uses multiple threads for the decoding, and wherein the method further comprises:
setting priority of tasks whose completion enables release of reconstructed image plane memory higher than priority of tasks in which reconstructed image plane memory is allocated.

18. The method of claim 1 wherein the video clip includes at least one picture encoded using inter-picture coding, and wherein the adapting memory usage comprises:

determining, according to the first memory usage settings, a first buffer size for decoding intra-coded content of the at least one picture encoded using inter-picture coding; and determining, according to the first memory usage settings, a second buffer size for decoding inter-coded content of the at least one picture encoded using inter-picture coding.

19. The method of claim 18 wherein the adapting memory usage further includes:

allocating a first buffer according to the first buffer size;

in the first buffer, storing entropy decoded transform coefficients for intra-coded blocks of a given picture of the at least one picture encoded using inter-picture coding;

allocating a second buffer according to the second buffer size, wherein the first buffer is smaller than the second buffer; and in the second buffer, storing entropy decoded transform coefficients for inter-coded blocks of the given picture.

20. The method of claim 18 wherein the adapting memory usage further includes, during the decoding of the video clip, dynamically growing the first buffer size and/or the second buffer size.

21. A computing system comprising a processor, memory, and storage storing computer-executable instructions for causing the computing system to perform a method comprising:

receiving at least part of a bitstream for a video clip;

determining first memory usage settings for decoding of the video clip;

determining second memory usage settings different than the first memory usage settings, the second memory usage settings indicating one or more theoretical limits on memory usage according to a standard or format specification for decoding of the video clip; and during the decoding of the video clip, adapting memory usage based at least in part on the first memory usage settings and the second memory usage settings, wherein the memory usage is initially set according to the first memory usage settings, and wherein the memory usage is increased during the decoding subject to the one or more theoretical limits in the second memory usage settings.

22. One of more tangible computer-readable media storing computer-executable instructions for causing a computing system programmed thereby to perform a method comprising:

receiving at least part of a bitstream for a video clip;

determining first memory usage settings for decoding of the video clip;

determining second memory usage settings different than the first memory usage settings, the second memory usage settings indicating one or more theoretical limits on memory usage according to a standard or format specification for decoding of the video clip; and during the decoding of the video clip, adapting memory usage based at least in part on the first memory usage settings and the second memory usage settings, wherein the memory usage is initially set according to the first memory usage settings, and wherein the memory usage is increased during the decoding subject to the one or more theoretical limits in the second memory usage settings.

* * * * *